(12) United States Patent
Burcham et al.

(10) Patent No.: US 10,013,707 B1
(45) Date of Patent: Jul. 3, 2018

(54) ADDRESS MODIFICATION FOR ADVERTISEMENT MEDIATION

(71) Applicant: Sprint Communications Company L.P., Overland Park, KS (US)

(72) Inventors: Robert H. Burcham, Overland Park, KS (US); Jason R. Delker, Olathe, KS (US); Geoffrey A. Holmes, Olathe, KS (US); Richard A. Rofail, Overland Park, KS (US)

(73) Assignee: Sprint Communications Company L.P., Overland Park, KS (US)

(*) Notice: Subject to any disclaimer, the term of this patent is extended or adjusted under 35 U.S.C. 154(b) by 613 days.

(21) Appl. No.: 14/160,215

(22) Filed: Jan. 21, 2014

(51) Int. Cl.
*G06Q 30/02* (2012.01)

(52) U.S. Cl.
CPC ......... *G06Q 30/0277* (2013.01); *G06Q 30/02* (2013.01); *G06Q 30/0267* (2013.01)

(58) Field of Classification Search
CPC . G06Q 30/0267; G06Q 30/02; G06Q 30/0277
See application file for complete search history.

(56) References Cited

U.S. PATENT DOCUMENTS

| | | |
|---|---|---|
| 5,636,346 A | 6/1997 | Saxe |
| 5,761,648 A | 6/1998 | Golden et al. |
| 5,848,396 A | 12/1998 | Gerace |
| 5,848,397 A | 12/1998 | Marsh et al. |
| 5,918,014 A | 6/1999 | Robinson |
| 5,918,041 A | 6/1999 | Berstis |
| 5,933,811 A | 8/1999 | Angles et al. |
| 5,937,392 A | 8/1999 | Alberts |
| 5,974,398 A | 10/1999 | Hanson et al. |
| 6,202,023 B1 | 3/2001 | Hancock et al. |
| 6,233,566 B1 | 5/2001 | Levine et al. |
| 6,266,649 B1 | 7/2001 | Linden et al. |
| 6,286,005 B1 | 9/2001 | Cannon |
| 6,317,722 B1 | 11/2001 | Jacobi et al. |

(Continued)

FOREIGN PATENT DOCUMENTS

| | | |
|---|---|---|
| WO | WO03044703 A1 | 5/2003 |
| WO | WO2012093396 A1 | 7/2012 |

(Continued)

OTHER PUBLICATIONS

Belser, John E., et al., entitled "Ad Management Using Ads Cached on a Mobile Electronic Device," filed Jan. 9, 2014, U.S. Appl. No. 14/150,832.

(Continued)

*Primary Examiner* — Patricia H Munson

(57) ABSTRACT

A method of routing advertisement based content requests through an advertisement gateway comprises receiving, on an electronic device, an advertisement content, rendering the advertisement content in a test environment, intercepting at least one outbound request for secondary content initiated by the execution of the advertisement content, where the outbound request is directed to an external source address other than an advertisement gateway, rewriting the advertisement content to direct the outbound request to the advertisement gateway address, creating a revised advertisement content based on the rewriting, and executing the revised advertisement content on the electronic device.

19 Claims, 12 Drawing Sheets

(56) References Cited

U.S. PATENT DOCUMENTS

| | | |
|---|---|---|
| 6,321,983 B1 | 11/2001 | Katayanagi et al. |
| 6,332,127 B1 | 12/2001 | Bandera et al. |
| 6,654,725 B1 | 11/2003 | Langheinrich et al. |
| 6,826,575 B1 | 11/2004 | Waclawski |
| 6,834,266 B2 | 12/2004 | Kumar et al. |
| 6,839,680 B1 | 1/2005 | Liu et al. |
| 6,853,982 B2 | 2/2005 | Smith et al. |
| 6,910,017 B1 | 6/2005 | Woo et al. |
| 6,963,867 B2 | 11/2005 | Ford et al. |
| 6,966,536 B2 | 11/2005 | Enomoto et al. |
| 6,990,462 B1 | 1/2006 | Wilcox et al. |
| 7,022,905 B1 | 4/2006 | Hinman et al. |
| 7,065,532 B2 | 6/2006 | Elder et al. |
| 7,096,194 B2 | 8/2006 | Johnson |
| 7,127,313 B2 | 10/2006 | Neri |
| 7,143,143 B1 | 11/2006 | Thompson |
| 7,251,615 B2 | 7/2007 | Woo |
| 7,284,033 B2 | 10/2007 | Jhanji |
| 7,353,267 B1 | 4/2008 | Cunningham |
| 7,406,436 B1 | 7/2008 | Reisman |
| 7,437,308 B2 | 10/2008 | Kumar et al. |
| 7,481,367 B2 | 1/2009 | Fees et al. |
| 7,647,258 B2 | 1/2010 | William et al. |
| 7,676,394 B2 | 3/2010 | Ramer et al. |
| 7,680,899 B1 | 3/2010 | Barnes et al. |
| 7,698,335 B1 | 4/2010 | Vronay |
| 7,788,644 B2 | 8/2010 | Koduru et al. |
| 7,797,565 B1 | 9/2010 | Tran et al. |
| 7,801,518 B1 | 9/2010 | Urbanek |
| 7,840,498 B2 | 11/2010 | Frank et al. |
| 7,840,551 B2 | 11/2010 | Wong et al. |
| 7,958,005 B2 | 6/2011 | Dangaltchev |
| 7,974,616 B1 | 7/2011 | Urbanek |
| 8,214,454 B1 | 7/2012 | Barnes et al. |
| 8,326,673 B1 | 12/2012 | Biere et al. |
| 8,355,955 B1 | 1/2013 | Mirchandani et al. |
| 8,423,408 B1 | 4/2013 | Barnes et al. |
| 8,442,858 B1 | 5/2013 | Barnes et al. |
| 8,788,690 B2 * | 7/2014 | Short .................... H04L 63/08 705/317 |
| 9,043,432 B2 | 5/2015 | Ahopelto |
| 9,275,390 B1 | 3/2016 | Barnes et al. |
| 9,319,379 B1 | 4/2016 | Burcham et al. |
| 9,331,983 B2 | 5/2016 | Zhou et al. |
| 9,374,335 B2 | 6/2016 | Burcham et al. |
| 9,818,133 B1 | 11/2017 | Bell et al. |
| 9,836,771 B1 | 12/2017 | Burcham et al. |
| 2001/0014601 A1 | 8/2001 | Kuwabara |
| 2001/0039500 A1 | 11/2001 | Johnson |
| 2001/0044743 A1 | 11/2001 | McKinley et al. |
| 2001/0047294 A1 | 11/2001 | Rothschild |
| 2002/0004855 A1 | 1/2002 | Cox et al. |
| 2002/0010627 A1 | 1/2002 | Lerat |
| 2002/0013727 A1 | 1/2002 | Lee |
| 2002/0026355 A1 | 2/2002 | Mitsuoka et al. |
| 2002/0026361 A1 | 2/2002 | Blom |
| 2002/0030100 A1 | 3/2002 | Katayanagi et al. |
| 2002/0032771 A1 | 3/2002 | Gledje |
| 2002/0035474 A1 | 3/2002 | Alpdemir |
| 2002/0059387 A1 | 5/2002 | Wolfe |
| 2002/0060246 A1 | 5/2002 | Gobburu et al. |
| 2002/0065713 A1 | 5/2002 | Awada et al. |
| 2002/0091569 A1 | 7/2002 | Kitaura et al. |
| 2002/0091571 A1 | 7/2002 | Thomas et al. |
| 2002/0095333 A1 | 7/2002 | Jokinen et al. |
| 2002/0107027 A1 | 8/2002 | O'Neil |
| 2002/0128904 A1 | 9/2002 | Carruthers et al. |
| 2002/0128908 A1 | 9/2002 | Levin et al. |
| 2002/0143630 A1 | 10/2002 | Steinman et al. |
| 2002/0152133 A1 | 10/2002 | King et al. |
| 2002/0165849 A1 | 11/2002 | Singh et al. |
| 2002/0184080 A1 | 12/2002 | Murad et al. |
| 2003/0004802 A1 | 1/2003 | Callegari |
| 2003/0004808 A1 | 1/2003 | Elhaoussine et al. |
| 2003/0007643 A1 | 1/2003 | Ben-Zur et al. |
| 2003/0018516 A1 | 1/2003 | Ayala et al. |
| 2003/0018558 A1 | 1/2003 | Heffner et al. |
| 2003/0023482 A1 | 1/2003 | Messner et al. |
| 2003/0028451 A1 | 2/2003 | Ananian |
| 2003/0032409 A1 | 2/2003 | Hutcheson et al. |
| 2003/0046139 A1 | 3/2003 | Beman et al. |
| 2003/0050863 A1 | 3/2003 | Radwin |
| 2003/0074251 A1 | 4/2003 | Kumar et al. |
| 2003/0074259 A1 | 4/2003 | Slyman, Jr. et al. |
| 2003/0101024 A1 | 5/2003 | Adar et al. |
| 2003/0101449 A1 | 5/2003 | Bentolila et al. |
| 2003/0126250 A1 | 7/2003 | Jhanji |
| 2003/0171962 A1 | 9/2003 | Hirth et al. |
| 2003/0172007 A1 | 9/2003 | Helmolt et al. |
| 2003/0229502 A1 | 12/2003 | Woo |
| 2004/0019540 A1 | 1/2004 | William et al. |
| 2004/0019541 A1 | 1/2004 | William et al. |
| 2004/0111315 A1 | 6/2004 | Sharma et al. |
| 2004/0148628 A1 | 7/2004 | Mears |
| 2004/0194052 A1 | 9/2004 | Hoffschulz et al. |
| 2005/0021403 A1 | 1/2005 | Ozer et al. |
| 2005/0028188 A1 | 2/2005 | Latona et al. |
| 2005/0078660 A1 | 4/2005 | Wood |
| 2005/0101332 A1 | 5/2005 | Kotzin |
| 2005/0102272 A1 | 5/2005 | Kumar et al. |
| 2005/0114829 A1 | 5/2005 | Robin et al. |
| 2005/0177419 A1 | 8/2005 | Choi et al. |
| 2005/0193036 A1 | 9/2005 | Phillips et al. |
| 2005/0194431 A1 | 9/2005 | Fees et al. |
| 2005/0197887 A1 | 9/2005 | Zuerl et al. |
| 2005/0197918 A1 | 9/2005 | Wittmer et al. |
| 2005/0211783 A1 | 9/2005 | Chou |
| 2005/0215238 A1 | 9/2005 | Macaluso |
| 2005/0228754 A1 | 10/2005 | Pezzaniti et al. |
| 2005/0229047 A1 | 10/2005 | Hanes et al. |
| 2005/0245246 A1 | 11/2005 | Munch et al. |
| 2005/0246394 A1 | 11/2005 | Neri |
| 2005/0251856 A1 | 11/2005 | Araujo et al. |
| 2005/0256759 A1 | 11/2005 | Acharya et al. |
| 2005/0278296 A1 | 12/2005 | Bostwick |
| 2006/0074769 A1 | 4/2006 | Looney et al. |
| 2006/0080135 A1 | 4/2006 | Frank et al. |
| 2006/0080171 A1 | 4/2006 | Jardins et al. |
| 2006/0085253 A1 | 4/2006 | Mengerink et al. |
| 2006/0085517 A1 | 4/2006 | Kaurila |
| 2006/0141428 A1 | 6/2006 | Herrod et al. |
| 2006/0178932 A1 | 8/2006 | Lang |
| 2006/0209884 A1 | 9/2006 | MacMullan et al. |
| 2006/0212350 A1 | 9/2006 | Ellis et al. |
| 2006/0223495 A1 | 10/2006 | Cassett et al. |
| 2006/0224437 A1 | 10/2006 | Gupta et al. |
| 2006/0271690 A1 | 11/2006 | Banga et al. |
| 2007/0005647 A1 | 1/2007 | Cugi et al. |
| 2007/0022009 A1 | 1/2007 | Cataldi et al. |
| 2007/0026871 A1 | 2/2007 | Wager |
| 2007/0060099 A1 | 3/2007 | Ramer et al. |
| 2007/0061229 A1 | 3/2007 | Ramer et al. |
| 2007/0094042 A1 | 4/2007 | Ramer et al. |
| 2007/0100963 A1 | 5/2007 | Ban et al. |
| 2007/0106520 A1 | 5/2007 | Akkiraju et al. |
| 2007/0118425 A1 | 5/2007 | Yruski et al. |
| 2007/0127500 A1 | 6/2007 | Maeng |
| 2007/0130005 A1 | 6/2007 | Jaschke |
| 2007/0192715 A1 | 8/2007 | Kataria et al. |
| 2007/0198339 A1 | 8/2007 | Shen et al. |
| 2007/0208619 A1 | 9/2007 | Branam et al. |
| 2007/0239518 A1 | 10/2007 | Chung et al. |
| 2007/0291789 A1 | 12/2007 | Kutt et al. |
| 2008/0004884 A1 | 1/2008 | Flake et al. |
| 2008/0010137 A1 | 1/2008 | Ho et al. |
| 2008/0040175 A1 | 2/2008 | Dellovo |
| 2008/0065476 A1 | 3/2008 | Klein et al. |
| 2008/0082412 A1 | 4/2008 | Tallyn et al. |
| 2008/0097851 A1 | 4/2008 | Bemmel et al. |
| 2008/0104637 A1 | 5/2008 | Rodriguez et al. |
| 2008/0120565 A1 | 5/2008 | Stiso et al. |
| 2008/0126515 A1 | 5/2008 | Chambers et al. |
| 2008/0129758 A1 | 6/2008 | Fox et al. |
| 2008/0140476 A1 | 6/2008 | Anand et al. |

(56) References Cited

U.S. PATENT DOCUMENTS

| | | | |
|---|---|---|---|
| 2008/0147478 A1 | 6/2008 | Mall et al. | |
| 2008/0228583 A1 | 9/2008 | MacDonald et al. | |
| 2009/0029721 A1 | 1/2009 | Doraswamy | |
| 2009/0048977 A1 | 2/2009 | Aggarwal et al. | |
| 2009/0070129 A1 | 3/2009 | Inbar et al. | |
| 2009/0076899 A1 | 3/2009 | Gbodimowo | |
| 2009/0099931 A1 | 4/2009 | Aaltonen et al. | |
| 2009/0150215 A1 | 6/2009 | Kalb et al. | |
| 2009/0154340 A1 | 6/2009 | Kumaresan et al. | |
| 2009/0157512 A1 | 6/2009 | King | |
| 2009/0198580 A1 | 8/2009 | Broberg et al. | |
| 2009/0217354 A1 | 8/2009 | Blum et al. | |
| 2009/0222329 A1 | 9/2009 | Ramer et al. | |
| 2009/0247193 A1 | 10/2009 | Kalavade | |
| 2009/0256858 A1 | 10/2009 | Ogikubo et al. | |
| 2009/0265245 A1 | 10/2009 | Wright | |
| 2009/0271255 A1 | 10/2009 | Utter et al. | |
| 2009/0292608 A1 | 11/2009 | Polachek | |
| 2010/0082422 A1 | 4/2010 | Heilig et al. | |
| 2010/0082429 A1 | 4/2010 | Samdadiya et al. | |
| 2010/0119111 A1 | 5/2010 | Helfman et al. | |
| 2010/0130178 A1 | 5/2010 | Bennett et al. | |
| 2010/0222035 A1 | 9/2010 | Robertson et al. | |
| 2010/0228592 A1 | 9/2010 | Anderson et al. | |
| 2010/0251169 A1 | 9/2010 | Kimchi et al. | |
| 2010/0274815 A1 | 10/2010 | Vanasco | |
| 2010/0299329 A1 | 11/2010 | Emanuel et al. | |
| 2011/0082939 A1 | 4/2011 | Montemurro et al. | |
| 2011/0131109 A1 | 6/2011 | Pappas et al. | |
| 2011/0153827 A1 | 6/2011 | Yengalasetti et al. | |
| 2011/0161512 A1 | 6/2011 | Wang et al. | |
| 2011/0239288 A1* | 9/2011 | Cross | G06F 21/51 726/11 |
| 2011/0246267 A1 | 10/2011 | Williams et al. | |
| 2011/0246890 A1 | 10/2011 | Mellamphy et al. | |
| 2011/0258049 A1 | 10/2011 | Ramer et al. | |
| 2011/0263196 A1 | 10/2011 | Saros et al. | |
| 2011/0270687 A1 | 11/2011 | Bazaz | |
| 2011/0288913 A1 | 11/2011 | Waylonis et al. | |
| 2012/0059696 A1* | 3/2012 | Theberge | G06Q 30/02 705/14.4 |
| 2012/0072271 A1 | 3/2012 | Dessert et al. | |
| 2012/0123830 A1 | 5/2012 | Svendsen et al. | |
| 2012/0170521 A1 | 7/2012 | Vogedes et al. | |
| 2012/0179536 A1 | 7/2012 | Kalb et al. | |
| 2012/0215911 A1 | 8/2012 | Raleigh et al. | |
| 2012/0226819 A1 | 9/2012 | Sylvain | |
| 2013/0006743 A1 | 1/2013 | Moore et al. | |
| 2013/0018714 A1 | 1/2013 | George | |
| 2013/0060631 A1 | 3/2013 | Corson et al. | |
| 2013/0139264 A1* | 5/2013 | Brinkley | G06F 21/566 726/24 |
| 2013/0211925 A1 | 8/2013 | Holland | |
| 2013/0211941 A1 | 8/2013 | Hallowell et al. | |
| 2013/0304586 A1 | 11/2013 | Angles et al. | |
| 2013/0311293 A1 | 11/2013 | Ward et al. | |
| 2013/0331027 A1 | 12/2013 | Rose et al. | |
| 2014/0059141 A1 | 2/2014 | Belkin et al. | |
| 2014/0066029 A1 | 3/2014 | Brennan et al. | |
| 2014/0080467 A1 | 3/2014 | Urbanek | |
| 2014/0089113 A1 | 3/2014 | Desai et al. | |
| 2014/0136314 A1 | 5/2014 | Kiet et al. | |
| 2014/0162685 A1 | 6/2014 | Edge | |
| 2014/0278953 A1 | 9/2014 | Ismail et al. | |
| 2014/0337090 A1 | 11/2014 | Tavares | |
| 2014/0379448 A1 | 12/2014 | Gregory | |
| 2014/0379467 A1 | 12/2014 | Huang et al. | |
| 2015/0074204 A1 | 3/2015 | Burcham et al. | |
| 2015/0121418 A1 | 4/2015 | Jain et al. | |

FOREIGN PATENT DOCUMENTS

| | | |
|---|---|---|
| WO | WO2013126759 A2 | 8/2013 |
| WO | WO2015038562 A1 | 3/2015 |

OTHER PUBLICATIONS

Burcham, Robert H., et al., entitled "IP Address Hashing in Advertisement Gateway," filed on Jan. 21, 2014, U.S. Appl. No. 14/160,196.

Burcham, Robert H., et al., entitled "Client Mediation and Integration to Advertisement Gateway," filed on Jan. 21, 2014, U.S. Appl. No. 14/160,206.

Burcham, Robert H., et al., entitled "Advertisement Mediation of Supply-Demand Communications," filed on Jan. 21, 2014, U.S. Appl. No. 14/160,224.

Katzer, Robin D., et al., entitled "Advertisement Dynamic Queue Management," filed Apr. 10, 2014, U.S. Appl. No. 14/250,381.

Burcham, Robert H., et al., entitled "Categorization of Unknown Variables in a Target Information Database," filed Nov. 4, 2014, U.S. Appl. No. 14/532,969.

Bell, Timothy L., et al., entitled "Method for Consumer Profile Consolidation Using Mobile Network Identification," filed Oct. 20, 2014, U.S. Appl. No. 14/518,504.

Arivukkarasu, Anand, et al., entitled "Telecom Services to Support Retail Fuel Stocking Logistics," filed Nov. 12, 2014, U.S. Appl. No. 14/539,715.

Delker, Jason R., et al., entitled, "Enhanced Dialer for a Mobile Communication Device," filed Mar. 4, 2015, U.S. Appl. No. 14/639,057.

Ferrante, Piero D., et al., entitled, "System and Method for Subscriber Cluster Synthesis," filed Feb. 11, 2015, U.S. Appl. No. 14/619,689.

Final Office Action dated Jun. 29, 2010, U.S. Appl. No. 11/558,021, filed Nov. 9, 2006, 28 pages.

Advisory Action dated Sep. 22, 2010, U.S. Appl. No. 11/558,021, filed Nov. 9, 2006, 3 pages.

Office Action dated Jun. 13, 2013, U.S. Appl. No. 11/558,021, filed Nov. 9, 2006.

Final Office Action dated Dec. 26, 2013, U.S. Appl. No. 11/558,021, filed Nov. 9, 2006.

Advisory Action dated Feb. 20, 2014, U.S. Appl. No. 11/558,021, filed Nov. 9, 2006, 3 pages.

Examiner's Answer date Aug. 26, 2014, U.S. Appl. No. 11/558,021, filed Nov. 9, 2006.

Office Action dated Aug. 30, 2010, U.S. Appl. No. 11/557,939, filed Nov. 8, 2006, 52 pages.

Final Office Action dated Jan. 31, 2011, U.S. Appl. No. 11/557,939, filed Nov. 8, 2006.

Advisory Action dated Mar. 22, 2011, U.S. Appl. No. 11/557,939, filed Nov. 8, 2006.

Office Action dated Oct. 31, 2013, U.S. Appl. No. 11/557,939, filed Nov. 8, 2006.

Office Action dated Aug. 5, 2014, U.S. Appl. No. 11/557,939, filed Nov. 8, 2006.

Final Office Action dated Mar. 2, 2015, U.S. Appl. No. 11/557,939, filed Nov. 8, 2006.

Office Action dated Sep. 30, 2010, U.S. Appl. No. 11/617,703, filed Dec. 28, 2006.

Final Office Action dated Mar. 25, 2011, U.S. Appl. No. 11/617,703, filed Dec. 28, 2006.

Advisory Action dated Jun. 7, 2011, U.S. Appl. No. 11/617,703, filed Dec. 28, 2006.

Notice of Allowance dated Aug. 1, 2012, U.S. Appl. No. 11/617,703, filed Dec. 28, 2006.

Office Action dated Jul. 21, 2011, U.S. Appl. No. 12/259,187, filed Oct. 27, 2008.

Final Office Action dated Dec. 12, 2011, U.S. Appl. No. 12/259,187, filed Oct. 27, 2008.

Advisory Action dated Feb. 29, 2012, U.S. Appl. No. 12/259,187, filed Oct. 27, 2008.

Office Action dated Dec. 6, 2013, U.S. Appl. No. 12/259,187, filed Oct. 27, 2008.

Final Office Action dated May 27, 2014, U.S. Appl. No. 12/259,187, filed Oct. 27, 2008.

Advisory Action dated Aug. 6, 2014, U.S. Appl. No. 12/259,187, filed Oct. 27, 2008.

(56) References Cited

OTHER PUBLICATIONS

Examiner's Answer dated Mar. 12, 2015, U.S. Appl. No. 12/259,187, filed Oct. 27, 2008.
FAIPP Pre-Interview Communication dated Apr. 3, 2015, U.S. Appl. No. 14/150,832, filed Jan. 9, 2014.
Lightningcast, Inc., "Lightningcast Mobile Video Advertising Solution," May 2, 2005, 14 pgs.
Connelly, Francis J., et al., "The Life Cycle Concept as a Long Term Forecasting Model", Academy of Marketing Journal (pre-1986); pp. 455-464, Summer 1974, 2, 3, ABI/INFORM Global.
Fisher, Marshall, et al., Accurate Retail Testing of Fashion Merchandise: Methodology and Application, Marketing Science, vol. 19, No. 3, pp. 266-278, Summer 2000, ABI/INFORM Global.
Kurawarwala, Abbas A., et al., "Forecasting and Inventory Management of Short Life-Cycle Products", Operations Research, vol. 44, No. 1, Jan.-Feb. 1996, pp. 131-150, INFORMS.
Stratman, Scott, "Allstockedup", Industrial Distribution, vol. 89, No. 11, Nov. 2000, pp. 92-96, ABI/INFORM Global.
Vijayan, Jaikumar, "IBM Service Follows Products After Delivery", Computerworld, vol. 35, No. 28, p. 14, Jul. 9, 2001, ABI/INFORM Global.
Sterling, Greg, "Google Replacing "Android ID" with "Advertising ID" Similar to Apple's IDFA," http://marketingland.com/google-replacing-android-id-with-advertising-id-similar-to-apples-idfa-63636, posted Oct. 31, 2013.
Janssen, Cory, "Identifier for Advertisers (IFA)," http://www.techopedia.com/definition/29032/identifier-for-advertisers-ifa-ifda, Apr. 3, 2014, last accessed Feb. 10, 2015.
The iPhone Wiki, "UDID," http://theiphonewiki.com/wiki/UDID, Apr. 3, 2014, last accessed Feb. 10, 2015.
Google Developer Android, "Advertising ID," http://developerandroid.com/google/play-services/id.html, Apr. 3, 2014, last accessed Feb. 10, 2015.
Wikipedia, "Real-time Bidding," http://en.wikipedia.org/wiki/Real-time_bidding, Apr. 3, 2014, last accessed Feb. 10, 2015.
Reynolds, Kevin, "Are Ad Exchanges and Real Time Bidding the Next Big Thing?,"http://www.advertisingperspectives.com/adblog/media-activation/are-ad-exchanges-and-real-time-bidding-the-next-big-thing/, Apr. 3, 2014, last accessed Feb. 10, 2015.
Foreign Communication from a Related Counterpart—International Search Report and Written Opinion, dated Dec. 24, 2014, PCT/US14/54877, filed on Nov. 11, 2014.
Thierer, et al., "Privacy Solutions (Part 2): Adblock Plus," Technology Liberation Front, Sep. 8, 2008, on line at techliberation.com.
Barnes, James D., et al., entitled, "Systems and Methods for State-Based Advertisement Messaging Across Media Types," filed May 22, 2006, U.S. Appl. No. 11/438,540.
Barnes, James D., et al., entitled, "In-Flight Campaign Optimization," filed Nov. 9, 2006, U.S. Appl. No. 11/558,021.
Barnes, James D., et al., entitled "Mobile-Device-Based Coupon Management Systems and Methods," filed Apr. 13, 2006, U.S. Appl. No. 11/403,614.
Barnes, James D., et al., entitled, "Inventory Management Integrating Subscriber and Targeting Data," Jun. 26, 2006, U.S. Appl. No. 11/474,880.
Barnes, James D., et al., entitled, "Behavioral Analysis Engine for Profiling Wireless Subscribers," filed Nov. 8, 2006, U.S. Appl. No. 11/557,939.
Barnes, James D., et al., entitled, "Advertisement Inventory Management," filed Oct. 27, 2008, U.S. Appl. No. 12/259,187.
Martin, Geoff S. et al., entitled, "Method and System for Providing Custom Background-Downloads," filed Nov. 16, 2007, U.S. Appl. No. 11/280,576.
McConnell, Von K. et al., entitled, "Method and System Using Location History for Targeted Coupon Distribution," filed May 17, 2000, U.S. Appl. No. 09/572,282.
Weaver, Farni, et al., "Method and System for Facilitating Determination of Call-Drop Locations in a Wireless Network," filed Sep. 9, 2003, U.S. Appl. No. 10/658,353.
Burcham, Robert H., et al., entitled "System and Method for Identifying a Mobile Device with Near Real Time Visualization to Action," filed Sep. 11, 2013, U.S. Appl. No. 14/024,627.
Burcham, Robert H. et al., entitled "Methods and Systems of Generating a Unique Mobile Device Identifier," filed Aug. 1, 2013, U.S. Appl. No. 13/956,367.
Holmes, Geoffrey A., entitled "Methods and Systems of Collecting and Segmenting Device Sensor Data for Mobile Device Identification," filed Jun. 5, 2013, U.S. Appl. No. 13/911,074.
Notice of Allowance dated Jul. 16, 2015, U.S. Appl. No. 11/438,540, filed May 22, 2006.
Final Office Action dated Aug. 31, 2015, U.S. Appl. No. 11/474,880, filed Jun. 26, 2006.
FAIPP Pre-Interview Communication dated Sep. 23, 2015, U.S. Appl. No. 13/956,367, filed Aug. 1, 2013.
FAIPP Office Action dated Jul. 2, 2015, U.S. Appl. No. 14/150,832, filed Jan. 9, 2014.
FAIPP Pre-Interview Communication dated Sep. 18, 2015, U.S. Appl. No. 14/494,601, filed Sep. 24, 2014.
Wikipedia, "Foursuare," https://en.wikipedia.org/w/index.php?title=Foursquare&oldid=681836736, Mar. 2009, last accessed on Sep. 25, 2015.
Belser, John E., et al., entitled "End User Participation in Mobile Advertisement," filed Sep. 24, 2014, U.S. Appl. No. 14/494,601.
Advisory Action dated Oct. 29, 2015, U.S. Appl. No. 11/474,880, filed Jun. 26, 2006.
Supplemental Advisory Action dated Nov. 2, 2015, U.S. Appl. No. 11/474,880, filed Jun. 26, 2006.
Advisory Action dated May 18, 2015, U.S. Appl. No. 11/557,939, filed Nov. 8, 2006.
Office Action dated Dec. 17, 2015, U.S. Appl. No. 11/557,939, filed Nov. 8, 2006.
FAIPP Pre-Interview Communication dated Nov. 18, 2015, U.S. Appl. No. 14/024,629, filed Sep. 11, 2013.
Notice of Allowance dated Dec. 16, 2015, U.S. Appl. No. 13/956,367, filed Aug. 1, 2013.
Final Office Action dated Oct. 29, 2015, U.S. Appl. No. 14/150,832, filed Jan. 9, 2014.
Advisory Action dated Jan. 7, 2016, U.S. Appl. No. 14/150,832, filed Jan. 9, 2014.
First Action Interview Office Action dated Dec. 17, 2015, U.S. Appl. No. 14/494,601, filed Sep. 24, 2014.
Office Action—Restriction requirement dated Jun. 17, 2008, U.S. Appl. No. 11/405,195, filed Apr. 17 2006, 7 pages.
Office Action dated Aug. 15, 2008, U.S. Appl. No. 11/405,195, filed Apr. 17 2006, 12 pages.
Final Office Action dated Feb. 26, 2009, U.S. Appl. No. 11/405,195, 17 pages.
Advisory Action dated May 7, 2009, U.S. Appl. No. 11/405,195, 2 pages.
Office Action dated Aug. 18, 2009, U.S. Appl. No. 11/405,195, 17 pages.
Final Office Action dated Oct. 27, 2010, U.S. Appl. No. 11/405,195 filed Apr. 17, 2006.
Office Action dated Feb. 8, 2011, U.S. Appl. No. 11/405,195, filed Apr. 17, 2006.
Final Office Action dated Jul. 22, 2011, U.S. Appl. No. 11/405,195, filed Apr. 17, 2006.
Office Action dated Apr. 6, 2012, U.S. Appl. No. 11/405,195, filed Apr. 17, 2006.
Notice of Allowance dated Dec. 6, 2012, U.S. Appl. No. 11/405,195, filed Apr. 17, 2006.
Office Action dated Feb. 27, 2009, U.S. Appl. No. 11/433,301, filed May 12, 2006, 13 pages.
Notice of Allowance dated Oct. 26, 2009, U.S. Appl. No. 11/433,301, filed May 12, 2006, 7 pages.
Office Action dated Jun. 17, 2008, U.S. Appl. No. 11/403,614, filed Apr. 13, 2006, 7 pages.
Office Action dated Aug. 27, 2008, U.S. Appl. No. 11/403,614, filed Apr. 13, 2006, 11 pages.
Final Office Action dated Mar. 4, 2009, U.S. Appl. No. 11/403,614, filed Apr. 13, 2006, 12 pages.

(56) References Cited

OTHER PUBLICATIONS

Advisory Action dated May 7, 2009, U.S. Appl. No. 11/403,614, filed Apr. 13, 2006, 3 pages.
Office Action dated Aug. 20, 2009, U.S. Appl. No. 11/403,614, filed Apr. 13, 2006, 11 pages.
Final Office Action dated Nov. 8, 2010, U.S. Appl. No. 11/403,614, filed Apr. 13, 2006.
Office Action dated Dec. 3, 2012, U.S. Appl. No. 11/403,614, filed Apr. 13, 2006.
Final Office Action dated Jun. 10, 2013, U.S. Appl. No. 11/403,614, filed Apr. 13, 2006.
Advisory Action dated Aug. 22, 2013, U.S. Appl. No. 11/403,614, filed Apr. 13, 2006.
Office Action dated Nov. 3, 2008, U.S. Appl. No. 11/438,540, filed May 22, 2006, 14 pages.
Final Office Action dated Apr. 28, 2009, U.S. Appl. No. 11/438,540, filed May 22, 2006, 16 pages.
Advisory Action dated Jul. 10, 2009, U.S. Appl. No. 11/438,540, filed May 22, 2006, 3 pages.
Office Action dated Oct. 16, 2009, U.S. Appl. No. 11/438,540, filed May 22, 2006, 12 pages.
Final Office Action dated Apr. 20, 2010, U.S. Appl. No. 11/438,540, filed May 22, 2006, 26 pages.
Advisory Action dated Jul. 2, 2010, U.S. Appl. No. 11/438,540, filed May 22, 2006, 4 pages.
Office Action dated Oct. 14, 2010, U.S. Appl. No. 11/438,540, filed May 22, 2006.
Final Office Action dated Mar. 30, 2011, U.S. Appl. No. 11/438,540, filed May 22, 2006.
Examiner's Answer dated Oct. 27, 2011, U.S. Appl. No. 11/438,540, filed May 22, 2006.
Decision on Appeal dated Apr. 28, 2015, U.S. Appl. No. 11/438,540, filed May 22, 2006.
Office Action dated Nov. 14, 2008, U.S. Appl. No. 11/474,880, filed Jun. 26, 2006, 17 pages.
Final Office Action dated May 28, 2009, U.S. Appl. No. 11/474,880, filed Jun. 26, 2006, 23 pages.
Advisory Action dated Oct. 19, 2009, U.S. Appl. No. 11/474,880, filed Jun. 26, 2006, 4 pages.
Advisory Action (corrected) dated Oct. 27, 2009, U.S. Appl. No. 11/474,880, filed Jun. 26, 2006, 4 pages
Office Action dated Mar. 5, 2010, U.S. Appl. No. 11/474,880, filed Jun. 26, 2006, 24 pages.
Final Office Action dated Aug. 18, 2010, U.S. Appl. No. 11/474,880, filed Jun. 26, 2006, 20 pages.
Office Action dated Mar. 30, 2011, U.S. Appl. No. 11/474,880, filed Jun. 26, 2006.
Final Office Action dated Sep. 7, 2011, U.S. Appl. No. 11/474,880, filed Jun. 26, 2006.
Advisory Action dated Nov. 15, 2011, U.S. Appl. No. 11/474,880, filed Jun. 26, 2006.
Examiner's Answer dated May 1, 2012, U.S. Appl. No. 11/474,880, filed Jun. 26, 2006.
Decision on Appeal dated Nov. 18, 2014, U.S. Appl. No. 11/474,880, filed Jun. 26, 2006.
Office Action dated Feb. 25, 2015, U.S. Appl. No. 11/474,880, filed Jun. 26, 2006.
Office Action dated Feb. 4, 2009, U.S. Appl. No. 11/491,387, filed Jul. 21, 2006, 9 pages.
Final Office Action dated Aug. 6, 2009, U.S. Appl. No. 11/491,387 filed Jul. 21, 2006, 13 pages.
Advisory Action dated Oct. 19, 2009, U.S. Appl. No. 11/491,387, filed Jul. 21, 2006, 4 pages.
Examiner's Answer dated Nov. 8, 2010, U.S. Appl. No. 11/491,387, filed Jul. 21, 2006.
Decision on Appeal dated Oct. 9, 2012, U.S. Appl. No. 11/491,387, filed Jul. 21, 2006.
Notice of Allowance dated Jan. 8, 2013, U.S. Appl. No. 11/491,387, filed Jul. 21, 2006.
Office Action dated Jan. 6, 2010, U.S. Appl. No. 11/558,021, filed Nov. 9, 2006, 7 pages.
Final Office Action dated May 3, 2016, U.S. Appl. No. 11/557,939, filed Nov. 8, 2006.
Restriction Requirement dated May 19, 2016, U.S. Appl. No. 14/024,627, filed Sep. 11, 2013.
Office Action dated May 17, 2016, U.S. Appl. No. 14/150,832, filed Jan. 9, 2014.
First Action Interview Office Action dated Apr. 28, 2016, U.S. Appl. No. 14/245,822, filed Apr. 4, 2014.
Office Action dated Jul. 1, 2016, U.S. Appl. No. 14/165,569, filed Jan. 27, 2014.
Office Action dated Jul. 14, 2016, U.S. Appl. No. 14/165,571, filed Jan. 27, 2014.
Final Office Action dated Apr. 28, 2016, U.S. Appl. No. 14/494,601, filed Sep. 24, 2014.
Notice of Allowance dated Jul. 22, 2016, U.S. Appl. No. 14/494,601, filed Sep. 24, 2014.
Burcham, Robert H., et al., entitled "Swipe Screen Advertisement Metrics and Tracking," filed on Nov. 27, 2013, U.S. Appl. No. 61/910,001.
Burcham, Robert H., et al., entitled "Swipe Screen Advertisement Metrics and Tracking," filed on Jan. 27, 2014, U.S. Appl. No. 14/165,569.
Delker, Jason R., et al., entitled "Ad Management Using Ads Cached on a Mobile Electronic Device," filed on Nov. 27, 2013, U.S. Appl. No. 61/910,002.
Delker, Jason R., et al., entitled "Ad Management Using Ads Cached on a Mobile Electronic Device," filed on Jan. 27, 2014, U.S. Appl. No. 14/165,571.
FAIPP Office Action dated Aug. 24, 2016, U.S. Appl. No. 13/911,074, filed Jun. 5, 2013.
Office Action dated Aug. 24, 2016, U.S. Appl. No. 14/160,196, filed Jan. 21, 2014.
FAIPP Pre-Interview Communication dated Aug. 4, 2016, U.S. Appl. No. 14/160,206, filed Jan. 21, 2014.
FAIPP Office Action dated Oct. 21, 2016, U.S. Appl. No. 14/160,206, filed Jan. 21, 2014.
FAIPP Pre-Interview Communication dated Sep. 19, 2016, U.S. Appl. No. 14/160,224, filed Jan. 21, 2014.
FAIPP Office Action dated Oct. 21, 2016, U.S. Appl. No. 14/160,224, filed Jan. 21, 2014.
Final Office Action dated Dec. 14, 2016, U.S. Appl. No. 13/911,074, filed Jun. 5, 2013.
Advisory Action dated Feb. 22, 2107, U.S. Appl. No. 13/911,074, filed Jun. 5, 2013.
Final Office Action dated Feb. 24, 2017, U.S. Appl. No. 14/160,196, filed Jan. 21, 2014.
FAIPP Pre-Interview Communication dated , U.S. Appl. No. 14/518,504, filed Oct. 20, 2014.
Notice of Allowance dated Jan. 28, 2016, U.S. Appl. No. 14/024,629, filed Sep. 11, 2013.
FAIPP Pre-Interview Communication dated Apr. 15, 2016, U.S. Appl. No. 13/911,074, filed Jun. 5, 2013.
FAIPP Pre-Interview Communication dated Feb. 16, 2016, U.S. Appl. No. 14/245,822, filed Apr. 4, 2014.
Foreign Communication from a Related Counterpart—Preliminary Report on Patentability dated Mar. 24, 2016, PCT/US14/54877, filed on Sep. 10, 2014.
Hannebaum, Ryan K., et al., entitled, "Advertisement Campaign Target Selection Engine," filed Apr. 4, 2014, U.S. Appl. No. 14/245,822.
Final Office Action dated May 11, 2017, U.S. Appl. No. 14/160,196, filed Jan. 21, 2014.
Final Office Action dated Mar. 24, 2017, U.S. Appl. No. 14/160,206, filed Jan. 21, 2014.
Final Office Action dated May 5, 2017, U.S. Appl. No. 14/160,224, filed Jan. 21, 2014.
Advisory Action dated Jul. 26, 2017, U.S. Appl. No. 14/160,196, filed Jan. 21, 2014.
Notice of Allowance dated Jul. 26, 2017, U.S. Appl. No. 14/160,206, filed Jan. 21, 2014.

(56) References Cited

OTHER PUBLICATIONS

Advisory Action dated Jul. 26, 2017, U.S. Appl. No. 14/160,224, filed Jan. 21, 2014.
Notice of Allowance dated Jul. 10, 2017, U.S. Appl. No. 14/518,504, filed Oct. 20, 2014.
Office Action dated Nov. 29, 2017, U.S. Appl. No. 13/911,074, filed Jun. 5, 2013.
Notice of Allowance dated Feb. 2, 2018, U.S. Appl. No. 14/160,224, filed Jan. 21, 2014.

* cited by examiner

ADDRESS MODIFICATION FOR ADVERTISEMENT MEDIATION

CROSS-REFERENCE TO RELATED APPLICATIONS

The present application is related to U.S. application Ser. No. 14/160,224, filed on Jan. 21, 2014, by Burcham et al, entitled "Advertisement Mediation of Supply-Demand Communications," U.S. application Ser. No. 14/160,206, filed on Jan. 21, 2014, by Burcham et al, entitled "Client Mediation and Integration to Advertisement Gateway," and U.S. application Ser. No. 14/160,196, filed on Jan. 21, 2014, by Burcham et al, entitled "IP Address Hashing in Advertisement Gateway," each of which is incorporated herein by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Devices include applications, such as web browsers, that can request content from content providers, such as website servers. Advertisements can be inserted into the content during the display of the content on an electronic device. The advertisements may vary based on the type and size of the advertisement that can be inserted into the content.

SUMMARY

In an embodiment, a method of routing advertisement based content requests through an advertisement gateway comprises receiving, on an electronic device, an advertisement content, rendering the advertisement content in a test environment, intercepting at least one outbound request for secondary content initiated by the execution of the advertisement content, where the outbound request is directed to an external source address other than an advertisement gateway, rewriting the advertisement content to direct the outbound request to the advertisement gateway address, creating a revised advertisement content based on the rewriting, and executing the revised advertisement content on the electronic device.

In an embodiment, a method of routing advertisement based content requests through an advertisement gateway comprises receiving, at an advertisement gateway, an advertisement content, sending the advertisement content to an electronic device, where the advertisement content comprises a secondary content reference to an external source address other than the advertisement gateway, receiving, at the advertisement gateway, a secondary content request for secondary content, where the request comprises the external source address as a parameter, accessing the external source address, removing at least a portion of any identifying information of the electronic device from the request, creating a modified request comprising the external source address, where the modified request has at least the portion of any identifying information of the electronic device removed, requesting the secondary content using the modified request, receiving, at the advertisement gateway, the secondary content based on the modified request, and sending the secondary content to the electronic device.

In an embodiment, a system executing on an electronic device for directing advertisement content requests to an advertisement gateway comprises a processor, a memory, and a test environment execution application. When executed on the processor, the test environment execution application configures the processor to: render an advertisement content in a test environment; detect an outbound request for secondary content; extract a destination address of the outbound request; rewrite the destination address in the advertisement content to create a modified advertisement content when the destination address is different than an advertisement gateway address; and execute the modified advertisement content on the electronic device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
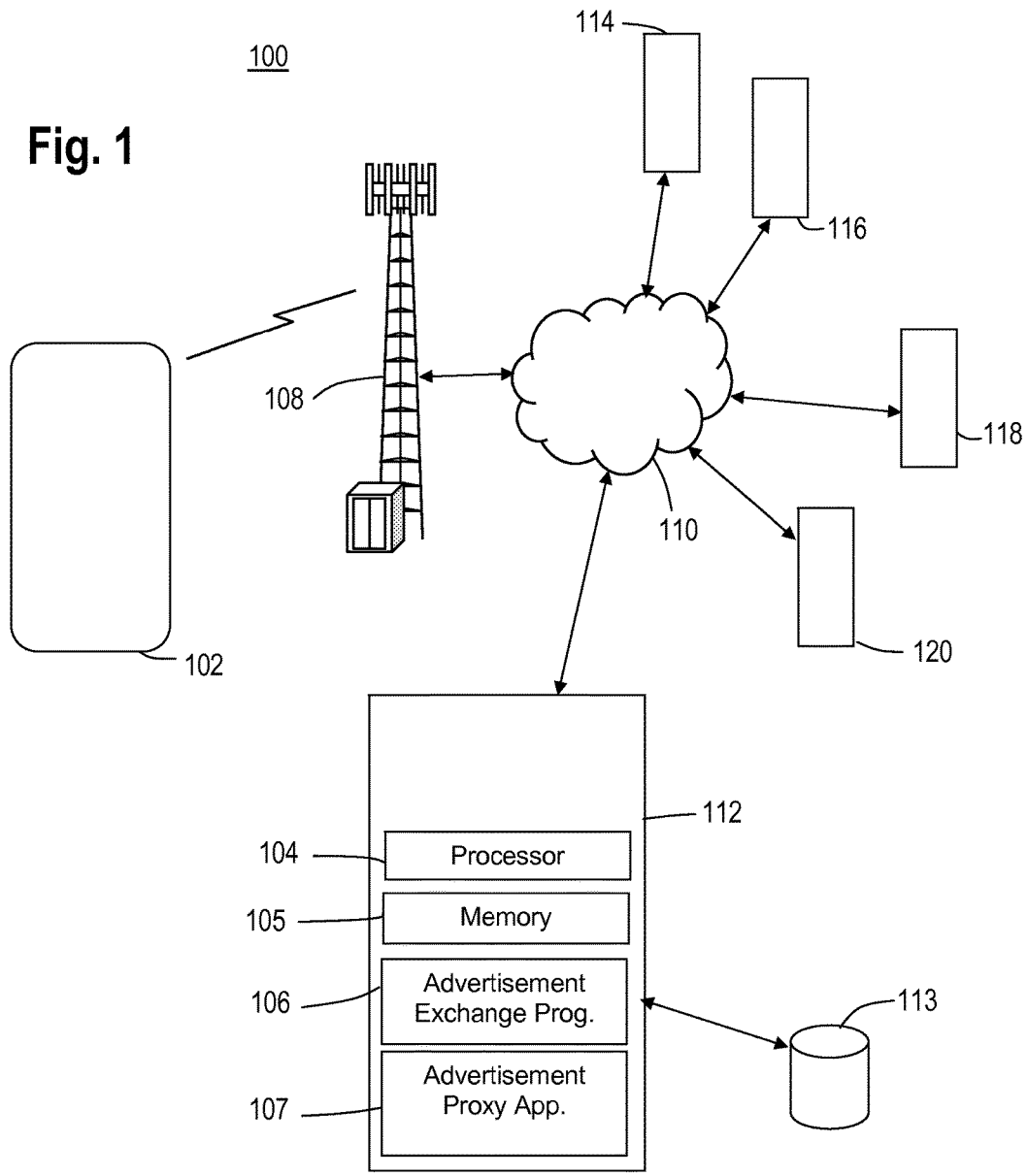
FIG. 1 is a schematic illustration of a wireless communications system according to some embodiments of the present disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

When an electronic device user selects a web page for viewing, an advertisement can be requested from an advertisement source to be dynamically inserted into a display of the electronic device user. The advertisement can be provided with the content to an electronic device, or in some instances, the advertisement can be requested from an advertisement provider when the content is rendered. The advertisement provider, for example a vendor of advertisements, may pay for displaying the content on the display of the electronic device. When the electronic device handles the insertion of the advertisement into a display, the request for the advertisement can originate with the electronic device itself. Information from the electronic device can be passed from the electronic device to the advertisement provider, which can then be used to profile the electronic device over time. Even if the advertisement provider cannot directly contact the electronic device, the advertisement provider may misuse the profile information for the electronic device. A communication provider may lose control over the selection of the advertisements for the electronic device when the advertisement provider can profile the electronic device. For example, rather than providing an advertisement selected by the communication service provider, an advertisement provider may provide a different advertisement to the electronic device based on the profile.

Several methods and systems for reducing or limiting the profiling of an electronic device by an advertisement or content provider are provided herein. In some embodiments, a communication service provider can establish an advertisement gateway to handle the communications between the electronic devices and the various servers providing advertisements and content associated with the advertisements, which are collectively referred to as content servers herein. The advertisement gateway can perform several functions to protect the electronic device from profiling by the content servers including filtering identifying information from any messages sent by the electronic device and re-writing requests within the content to route any communications through the advertisement gateway.

The electronic device can also perform several functions to protect itself from profiling by the content servers including detecting and re-writing requests within the content it renders to route any communications through the advertisement gateway and/or handling some advertisement mediation. As noted above, the advertisement gateway can rewrite the references or links within the content as the content passes through the advertisement gateway. However, some content may not be recognized or be capable of being handled by the advertisement gateway. As a result, the content may execute on the electronic device, for example during rendering, and request content from an external source. In order to protect against content request messages from being sent to an external source, the electronic device can comprise a test environment for executing the content received at the device. The test environment can be used to detect and/or identify any external requests generated during execution or rendering of the content. Once identified, the external requests can be modified to identify the advertisement gateway rather than the external content reference. The external content reference can be embedded as a parameter within a request routed through the advertisement gateway for use in identifying the content server when the message is received by the advertisement gateway. The content can then be routed from the content server, through the advertisement gateway, and back to the electronic device.

In some embodiments, the advertisement gateway can protect the identity of the electronic device by filtering some or all of the information that could identify the electronic device. When messages are received from the electronic device at the advertisement gateway requesting the advertisements or advertisement content, the advertisement gateway can remove, alter, or wholly replace the identifying information present in the requests before sending the requests to the content servers. For example, the advertisement gateway can remove a portion of the identifying information, thereby preventing the content servers from receiving enough identifying information to profile the electronic device. In some embodiments, the advertisement gateway can alter the identifying information, for example, by creating new identity information from the identifying information present in the request from the electronic device.

In some cases, the identifying information provided in the request can be hashed with a temporary identifier to create new identity information. Hashing may be completed using a one-way secure cryptographic hash function, for instance one of MD5, SHA-0, SHA-1, SHA-2, SHA-3, or other well-known one-way secure cryptographic hash functions. Hereinafter, a one-way secure cryptographic hash function may be referred to more concisely as a hash function or a hashing function. Secure hashing can include any of those hashing methods described in patent application Ser. No. 13/956,367 entitled "Methods and Systems of Generating a Unique Mobile Device Identifier" filed on Aug. 1, 2013, which is incorporated by reference herein in its entirety. For example, the temporary identifier can comprise a temporal identifier such as a time period in which the request is received and/or sent. The temporal identifier can change when the time period described by the temporal identifier expires. The temporary identifier used to create the new identity information can remain constant for a given time period to allow the identity information provided to the content servers to remain the same during the time period. Once the temporary identifier changes, the resulting identity information also changes. This process can be used to shield the true identity of the electronic device and prevent long term profiling by the content servers.

In order to control the flow of content to and from the electronic devices, the advertisement gateway may re-write content references or links within content received at the advertisement gateway to route any subsequent requests through the advertisement gateway. In general, content containing links to advertisements or data can reference the content source as the location for obtaining the advertisement or data. For example, an advertisement can contain a number of links for requesting the images used to render the advertisement on the electronic device. Upon receiving and rendering the advertisement in the designated location on the display of the electronic device, the advertisement may attempt to contact a content provider server to obtain the images. If the request for the images passed directly to the content servers, the content servers could track or profile the electronic device.

In order to prevent the electronic device from contacting the content servers, the advertisement gateway can analyze any advertisements, content, or other data passing through the advertisement gateway to determine if any links or other references refer to an external content source, which would include a source other than the advertisement gateway and/or other communication service provider trusted source. When an external content source reference is located, the reference can be rewritten to reference the advertisement gateway. The original external content source reference can be included in the content as a parameter. For example, the external content source reference can be included as metadata in the content. Alternatively, the parameter can include any data structure within the content that is not the content address that can be determined and accessed by a server or electronic device. When the content is requested by the electronic device, the request can be directed to the advertisement gateway and include the external content source reference as the parameter based on the rewritten references. The advertisement gateway can then generate a request message for the content that is addressed to the external content source reference based on the external content source reference embedded as a parameter in the request from the electronic device. Upon receiving the content from the content source, the advertisement gateway can then forward the content to the electronic device. As a result, the content and request message can pass through the advertisement gateway, which can aid in shielding the identity of the electronic device from the external content source. The rewriting of the references or links can be used in conjunction with the filtering of the identity information to shield the electronic device from profiling over time.

In some embodiments, the electronic device can handle some advertisement mediation based on input from the advertisement gateway. Advertisement mediation can refer to the ability of a device to select an advertisement and/or an advertisement source to provide an advertisement in an available advertisement location, for example within content being rendered on the electronic device. In general, the advertisement gateway mediates the selection of the advertisement source, potentially the selection of the advertisement, and the communications between the electronic device and the content servers. However, the advertisement mediation may be delegated to the electronic device in some circumstances. The resulting advertisement mediation by the electronic device may distribute the load on the advertisement gateway and result in a more efficient provisioning of advertisements to the electronic device.

When the advertisement gateway can delegate the advertisement mediation function to the electronic device, the advertisement gateway can return an indication of the delegation to the electronic device in response to a request for an advertisement. While the indication can take a number of forms, the indication may comprise a message indicating that an advertisement is not available from the advertisement gateway. In order to aid in the advertisement mediation process, the message from the advertisement gateway may also indicate one or more media adapters of a plurality of media adapters on the electronic device to use in requesting an advertisement. The media adapters on the electronic device may comprise advertisement selection logic that can be used to select an advertisement source and generate a request message for an advertisement from the advertisement source. By providing feedback on the selection of the media adapter to use in requesting an advertisement, the advertisement gateway can provide some level of control over the advertisement selection. In some embodiments, the advertisement provider can include a trusted source and the advertisement request can be routed directly to the advertisement provider server from the electronic device. In other embodiments, the advertisement request message can pass through the advertisement gateway.

FIG. 1 shows a communications system 100 including an electronic device 102. The electronic device 102 may take various mobile forms including, but not limited to, a mobile telecommunication device, a mobile handset, a personal digital assistant (PDA), a handheld gaming device, a handheld wireless mobile device, a pager, a digital camera, a digital music player, and/or a digital calculator. Though illustrated as a mobile communication device, the electronic device 102 may take various additional forms including a personal computer, a mobile computer, a portable computer, a tablet computer, a laptop computer, and a desktop computer. In some embodiments of the present disclosure, the electronic device 102 is not a general purpose computing device like a portable, laptop or tablet computer, but rather is a special-purpose communications device. The electronic device 102 may support specialized activities such as gaming, inventory control, job control, and/or task management functions, and so on.

The electronic device 102 can include a display and a touch-sensitive surface or keys for input by a user. The electronic device 102 may present options for the user to select, controls for the user to actuate, and/or cursors or other indicators for the user to direct. The electronic device 102 may further accept data entry from the user, including numbers to dial or various parameter values for configuring the operation of the electronic device 102. The electronic device 102 may further execute one or more software or firmware applications in response to user commands. These applications may configure the electronic device 102 to perform various customized functions in response to user interaction.

The electronic device 102 may execute various applications or programs that allow the electronic device 102 to display content, at least some of which may be capable of having an advertisement embedded, displayed, or associated therewith. For example, the electronic device 102 may execute a web browser application which enables the display to show a web page, which may contain one or more advertisement or additional content. The web page may be obtained via wireless communications with a base transceiver station 108, a wireless network access node, a peer device, a wired connection, or any other wired/wireless communication network or system. The base transceiver station 108 (or wireless network access node) can be coupled to a network 110, such as the Internet and/or a wireless communication network. Via the wireless link and the network 110, the electronic device 102 may have access to information on various servers, such as an advertisement gateway 112, content provider servers 114, 116, a first advertisement provider server 118, and/or a second advertisement provider server 120.

The network 110 and the base transceiver station 108 can provide communication between the electronic device 102 and the various other components of the system 100 using standard wireless telephony protocol, such as code division multiple access (CDMA), global system for mobile communication (GSM), universal mobile telecommunications system (UMTS), and worldwide interoperability for microwave access (WiMAX), a wireless internet connection, or some other means of wireless communication. Although the network 110 is illustrated as providing wireless communication, various forms of wired communication may also be used. For example, an electronic device 102 may be wired into the network 110 and thereby provided communication with the components of the system 100.

The advertisement gateway 112 serves as a proxy between the electronic device 102 and the content provider servers 114, 116, the first advertisement provider server 118, and the second advertisement provider server 120. The advertisement gateway 112 serves to mediate communications to and from the electronic device 102 and protects the electronic device 102 from profiling by the advertisement providers operating the advertisement provider servers 118, 120 and/or the content providers operating the content provider servers 114, 116. In an embodiment, the advertisement gateway 112 interacts with the content provider servers 114, 116 and the advertisement provider servers 118, 120 through the network 110. As described in more detail below, the advertisement gateway 112 acts as a gateway or proxy between the electronic device 102 and the content provider servers 114, 116 and the advertisement provider servers 118, 120. Various applications associated with the advertisement gateway 112 can be stored in a memory associated with the advertisement gateway and/or a memory store 113. The memory store 113 may also store information related to the electronic device communications, selections of advertisement sources, selections of advertisements, requested content, and/or electronic device registers or lookup tables.

The content provider servers 114, 116 provide content that may be requested by the electronic device 102, such as web pages, interactive content in advertisements, and the like. Similarly, the advertisement provider servers 118, 120 provide advertisements that may be requested by the electronic device 102. The advertisements may contain links back to the advertisement provider servers 118, 120 and/or the content provider servers 114, 116. For example, the advertisements may comprise links to external content, and when executed and/or rendered on the electronic device 102, the links may be used to request content for rendering within the advertisement. The plurality of advertisement provider servers 118, 120 may be operated by related providers, or may each represent different and separate advertisement providers. The advertisement gateway 112 may serve to mediate advertisements and media to and from unrelated advertisement provider servers 118, 120 and perform the selection logic for providing advertisements to the electronic device 102. Each of the content providers servers 114, 116 and/or the advertisement provider servers 118, 120 can provide content in a variety of formats.

The advertisement gateway 112 may be implemented as a computer system and generally comprises a server having a processor 104 and a memory 105, as described in more detail herein. The advertisement gateway 112 may comprise one or more applications that serve to mediate the communication of content, advertisements, and advertisement related content between the electronic device 102 and the servers 114, 116, 118, 120. In an embodiment, the advertisement gateway 112 can comprise and execute an advertisement exchange application 106. The advertisement exchange application 106 is generally configured to shield the identity of the electronic device 102 from the content servers 114, 116 and the advertisement servers 118, 120, thereby preventing profiling of the electronic device 102 by those servers. In order to shield the identity of the electronic device 102, the advertisement gateway 112 can generally ensure that communications to and/or from the electronic device 102 pass through the advertisement gateway 112, and that any identifying portions of any messages or communications passing through the advertisement gateway 112 are filtered out, removed, or replaced. For example, the identifying information associated with communications from the electronic device 102 can be replaced with a controlled and potentially temporary identity. In this embodiment, the content servers 114, 116 and/or the advertisement provider servers 118, 120 may detect an identity of the electronic device 102 in the requests, but the identity may not be the true identity of the electronic device 102. Rather, the identity of the electronic device 102 may be a temporary identity useful in communicating with the servers 114, 116, 118, 120.

In an embodiment, the advertisement exchange application 106 may configure the advertisement gateway 112 to remove one or more information components from a request sent from the electronic device 102. In this embodiment, the electronic device 102 may initiate a request for an advertisement, for example in response to loading a content page having an advertisement opportunity available. A media adapter within the electronic device 102 may detect the available advertisement opportunity and generate an advertisement request that is sent to the advertisement gateway 112. Upon receiving the advertisement request, the advertisement gateway 112 may identify the various information components of the request. The various information components can include identity information such as an electronic device 102 identity, an originating IP address of the request message, an adapter identity, a phone number, a pinsight ID, and the like. The advertisement exchange application 106 may then remove some or all of the information components from the request. For example, the originating IP address can be removed from the request to shield the identity of the electronic device 102. In some embodiments, a unique identity can be assigned by the advertisement exchange application 106 and inserted into the request. The modified request may be referred to as a proxy request message. The unique identity can be temporary or representative of the electronic device 102 without providing a direct means of profiling the electronic device in the future 102. The advertisement exchange application 106 can then send the proxy request message without the information components to the content provider servers 114, 116 and/or the advertisement provider servers 118, 120. Upon receiving the proxy request message, the content server may return the requested content or advertisement to the advertisement gateway 112. The advertisement gateway 112 can then route the information back to the electronic device 102 using, for example, a lookup table correlating a unique identity assigned to the request with the electronic device 102 identity.

In an embodiment, the advertisement exchange application 106 may be configured to alter the identify information of the electronic device 102 by hashing the identity information with a temporal identifier to create a temporary identity. As used herein, hashing or a hashing function generally refers to mapping varying length data to a fixed length output. In an embodiment, this may be performed using a one-way secure cryptographic hash function. For example, the advertisement exchange application 106 may be configured to accept an identity of the electronic device 102 such as the originating IP address or a mobile ID of the electronic device 102 and combine the identity with a temporal identifier such as the month and year during which a request is sent to produce a single unique identity for the electronic device 102. For example, the originating IP address or mobile ID of the electronic device can be hashed with a month and year of time at which a request is sent to produce a unique identifier in an IP address format. The resulting unique identifier can change according to the changes in the temporal identifier, where the unique identifier can otherwise remain constant during a time period in which temporal identifier remains the same. By using the unique identifier as the originating identity in the request message, the request message appears to originate from a fixed electronic device, but any attempt to profile the source would only extend for the period during which the unique identification remains constant, for example during a single month.

Upon forwarding the request to the corresponding content servers 114, 116 and/or advertisement provider servers 118, 120, the content and/or advertisement returned to the advertisement gateway 112 may comprise links to sources external to the advertisement gateway 112. For example, an advertisement returned from the advertisement provider server 118 may contain content links directly referencing the advertisement provider server 118 and/or one of the content provider servers 114, 116. The advertisement gateway 112 may be configured to direct communications through the advertisement gateway 112 rather than allow content and/or advertisement requests to bypass the advertisement gateway 112. In an embodiment, an advertisement proxy application 107 may execute on the advertisement gateway 112. The advertisement proxy application 107 may configure the advertisement gateway 112 to analyze content and/or advertisements passing through the advertisement gateway 112 to determine if any external links, content requests, or executable programs or applications configured to return data from an external source are present. When a component in the content and/or advertisement references a source external to the advertisement gateway 112, the advertisement proxy application 107 may rewrite the content source reference in the content and/or advertisement to reference a proxy reference identifying the advertisement gateway 112. The original content source reference can be embedded within the content for use in redirecting the request from the advertisement gateway 112 to the content or advertisement source. For example, the original content source reference that is rewritten may be embedded as a parameter within the content. When the content is executed or rendered by the electronic device, a request can be generated that is directed to the advertisement gateway 112 and contains the original content source reference as a parameter. The original content source reference can then be extracted when the request from the electronic device is passed back through the advertisement gateway 112.

Figure 2:
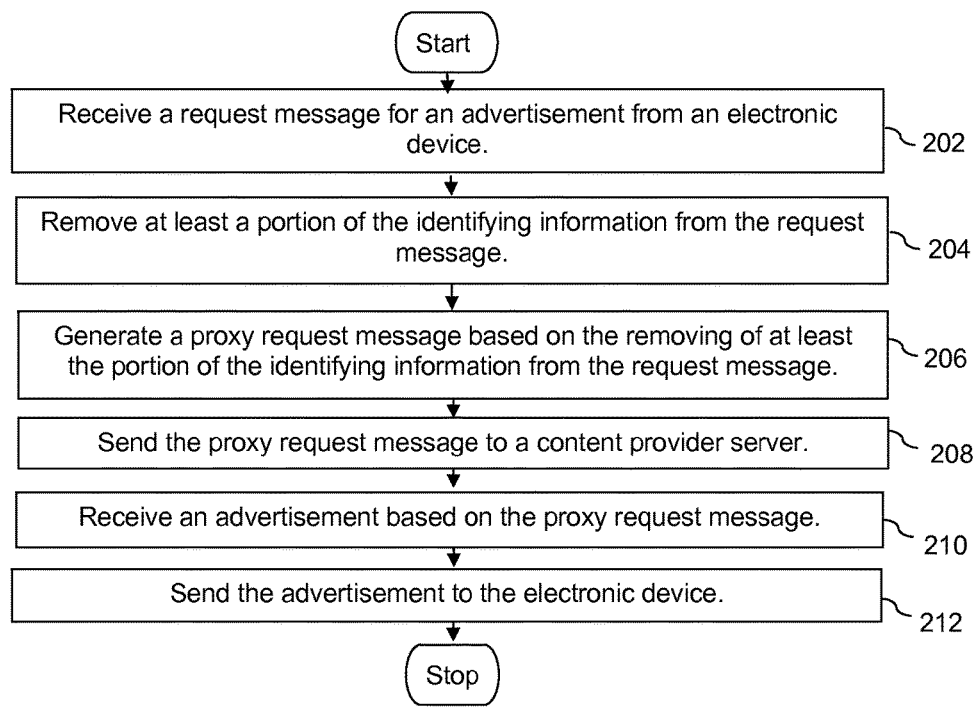
FIG. 2 is a flowchart illustrating a method for proxying content between a provider and an electronic device according to some embodiments of the present disclosure.

The system 100 can be used to shield the identity of the electronic device 102 from a content server by allowing the advertisement gateway 112 to filter out the identity of the electronic device 102 in messages passing from the electronic device 102 to the content servers 114, 116, 118, 120. FIG. 2 is a flowchart illustrating an embodiment of a method 200 for proxying content, such as advertisement content, between a provider and an electronic device. Referring to FIGS. 1 and 2, the method may be used to route content including advertisements and/or content associated with the advertisement through the advertisement gateway 112 while shielding the identity of the electronic device 102 from the advertisement and content provider servers 114, 116, 118, 120. The ability to shield the identity of the electronic device 102 may help prevent the advertisement provider or content providers from profiling the electronic device 102 and potentially attempting to directly contact the electronic device 102.

In the method 200, the advertisement gateway 112 receives a request message for an advertisement and/or advertisement content from an electronic device 102 in step 202. The request message comprises identifying information for the electronic device 102. In general, the identifying information may include some identification of the electronic device 102 and/or application generating the request message. For example, the identifying information may include an originating IP address, a mobile ID number, an application identification, a pinsight ID, or the like. In some embodiments, the request message may include additional information such as a specification of the advertisement format, the type of operating system executing on the electronic device 102, the type of application requesting the advertisement, and the like. In some embodiments, the identifying information may be located in the header of the request message.

In step 204, at least a portion of the identifying information may be removed from the request message. In an embodiment, the advertisement gateway 112 (e.g., the advertisement exchange application 106 operating on the advertisement gateway 112) may remove enough identifying information to prevent the identity of the electronic device 102 from being tracked over a long period of time. For example, all or a portion of an originating IP address, a mobile ID number, an application identification, a pinsight ID, or the like can be removed from the request message. The identifying information may be removed from the header of the request message.

In step 206, a proxy request message is generated based on the removing of at least the portion of the identifying information from the request message. The proxy request message comprises the request for the advertisement but does not comprise at least the portion of the identifying information removed from the request message. In some embodiments, the proxy request message may retain enough identifying information for the advertisement gateway 112 to recognize the proxy request message source and return any advertisements or content related to the advertisements to the electronic device 102. In some embodiments, a unique identification for the electronic device 102 may be added to the proxy request message. The unique identification can be added to the proxy request message after removing at least the portion of the identifying information from the request message. The unique identification may generally provide an identification of the electronic device 102 that is recognizable by the advertisement gateway 112. The unique identification may be changeable over time to prevent long term profiling of the electronic device 102.

In step 208, the proxy request message may be sent to a content server, for example, one or more of the content provider servers 114, 116, and/or the advertisement provider servers 118, 120. Upon receiving the proxy request message, the content server may analyze the request and return the content to the advertisement gateway 112. In an embodiment, the proxy request message is sent to at least one of the advertisement provider servers 118, 120. The advertisement provider servers 118, 120 may then return an advertisement to the advertisement gateway 112. In some embodiments, the proxy request message is sent to at least one of the content provider servers 114, 116. The content provider server or servers 114, 116 may analyze the proxy request message and return the requested content, which can be associated with an advertisement, to the advertisement gateway 112. Upon receiving the proxy request message, the content server may analyze the proxy request message to determine an identity of the electronic device 102 from which the message originated. The proxy request message may have at least a portion of the identifying information removed and/or a unique identification provided by the advertisement gateway inserted, which may limit or prevent the content server from determining the identifying information sent from the electronic device 102.

In step 210, the content is received at the advertisement gateway 112 from the content server in response to the proxy request message. For example, an advertisement can be returned from an advertisement provider server 118, 120 in response to the proxy request message requesting an advertisement. In some embodiments, content associated with an advertisement (e.g., an image, interactive content, etc.) may be received from one or more of the advertisement provider servers 118, 120 and/or the content provider servers 114, 116. In an embodiment, the content received from the content server may be in a format requested in the proxy request message.

In step 212, the content is sent to the electronic device 102. The advertisement gateway 112 may route the content to the electronic device 102 using a portion of the identifying information removed from the original request message. For example, the advertisement gateway 112 may store a portion of the identifying information removed from the request message in a look-up table in order to access the identifying information when the content is received from the content server. The advertisement gateway 112 may then restore at least a portion of the identifying information upon receiving the content to allow the content to be routed to the electronic device 102. For example, the identifying information may be replaced in the header of the content message to route the content to the electronic device 102. In some embodiments, the advertisement gateway 112 may route the content from the content server to the electronic device 102 without replacing the identifying information.

Upon receiving the content such as an advertisement and/or content associated with the advertisement, the electronic device 102 may render the content on a display screen. Portions of the content may comprise executable programs such as applications, applets, java scripts, or the like. In response to receiving the content and executing the content, the executable programs may generate a visual image, an audio presentation, or other output on the electronic device 102. The user of the electronic device 102 may then interact with the advertisement and/or content. For example, a user may select at least a portion of the advertisement. The interaction with the advertisement may generate further content requests, each of which may be routed through the advertisement gateway 112 in the same or similar way described in method 200.

Figure 3:
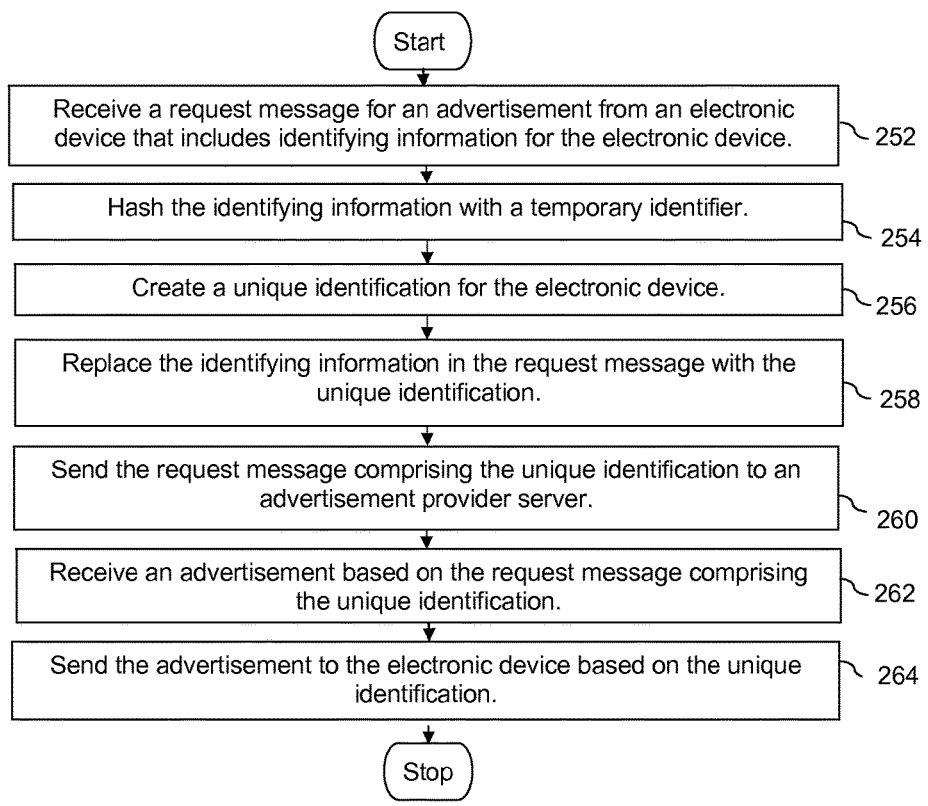
FIG. 3 is a flowchart illustrating a method for mediating content between content servers and an electronic device according to some embodiments of the present disclosure.

FIG. 3 is a flowchart illustrating a method 250 for mediating content between content servers and an electronic device 102. Referring to FIGS. 1 and 3, the method 250 may be used to route content including advertisements and/or content associated with the advertisement through the advertisement gateway 112 while providing a temporary identification of the electronic device 102 to the content servers 114, 116, 118, 120. The temporary identification may provide the content servers 114, 116, 118, 120 with an identification useful in indicating that the content was sent to an actual device while also shielding the actual identity of the electronic device 102 from the content servers 114, 116, 118, 120, which may prevent long-term profiling of the electronic device 102.

Initially, a request message is sent from the electronic device 102 to the advertisement gateway 112. In step 252, the advertisement gateway 112 can receive the request message from the electronic device 102, which can request content from a content server. The content may include an advertisement and/or content associated with an advertisement. The request message generally includes identifying information for the electronic device 102. For example, as described above with respect to the method 200, the identifying information can include an originating IP address, a mobile ID number, an application identification, a pinsight ID, or the like. In some embodiments, the identifying information may be contained in the header of the request message. When the request message is received at the advertisement gateway 112, the identifying information may be extracted by the advertisement gateway 112 for use in creating a unique identification for the electronic device 102.

In step 254, the identifying information may be hashed with a temporary identifier. The hashing may receive as inputs the identifying information and the temporary identifier and output a unique identification in a predetermined format. For example, the hashing may be completed using a one-way secure cryptographic hash function, for instance one of MD5, SHA-0, SHA-1, SHA-2, SHA-3, or other well-known one-way secure cryptographic hash functions. Secure hashing can include any of those hashing methods described in patent application Ser. No. 13/956,367 entitled "Methods and Systems of Generating a Unique Mobile Device Identifier" filed on Aug. 1, 2013, which was incorporated by reference above in its entirety. By using the identifying information from the request message, the hashing operation outputs an identification that is unique to the electronic device 102. By using a temporary identifier, the resulting unique identity remains the same during the time the temporary identifier remains unchanged. Once the temporary identifier is changed, the hashing operation results in a different unique identification even if the identifying information from the electronic device 102 remains the same. In some embodiments, both the identifying information from the electronic device 102 and the temporary identifier can change, thereby resulting in a new unique identification for the electronic device 102.

The temporary identifier can comprise a variety of different types of identifiers. In an embodiment, the temporary identifier can include a time stamp, a rotating password, a message ID, or the like. The temporary identifier may not be unique across a plurality of electronic devices 102 when the identifying information is unique to each electronic device 102 across a plurality of electronic devices 102.

In an embodiment, the temporary identifier comprises a temporal identifier. The temporal identifier comprises a value indicative of a time or a time period. For example, the temporal identifier can comprise a value indicative of or encoding the year and month in which the request message is sent. Various other time periods including the century, year, month, date, day of the week, week of the month, day of the year, hour of the day, minute of the hour or day, and the like can also be used as the temporal identifier. It is understood that many formats for representing time and/or time periods are contemplated by the present disclosure. For example, the time could be represented as seconds elapsed since a predefined moment in time, such as seconds elapsed since midnight Jan. 1, 1970, seconds elapsed since noon Jul. 14, 2010, or seconds elapsed since some other predefined moment in time. The elapsed time could be represented as minutes, hours, days, months, or some other unit of time elapsed since the predefined moment in time. For example, the temporal identifier can comprise hours elapsed or days elapsed or months elapsed since a predefined moment in time. The use of the temporal identifier creates a temporary identifier that is valid for a limited time period. For example, when the year and month are used as the temporal identifier, the temporal identifier will change each month. Other time periods can also be used to create a temporal identifier that changes according to a specific time period. When the temporary identifier comprises a temporal identifier, the identifying information can be hashed with the temporal identifier. For example, the identifying information can be hashed with an identifier indicative of the year and month.

In step 256, the hashing operation may result in the creation of a unique identification for the electronic device 102, which may have a predetermined format. In an embodiment, the unique identification can include a format that is the same as that of the identifying information. For example, the hashing may result in a unique identifier having the same format as the identifying information, only with a different value or sequence. In some embodiments, the unique identification may have a different format than that of the identifying information. This embodiment may be useful in allowing the request message to be presented as coming from a different source, application, or device than the electronic device 102. The format of the unique identification may comprise the format of an IP address, a mobile ID number, an application identification, or the like. Since the unique identifier results from the hashing operation, a change in either the identifying information and/or the temporary identifier can result in a new unique identification.

In an embodiment, the hashing function can be used with the identifying information and a temporal identifier to create the unique identification. The use of the temporal identifier can result in a unique identification that is valid during the time period described by the temporal identifier. For example, when the temporal identifier comprises the year and month in which the request is sent, the unique identification will remain constant during a period of a month. At the end of the month, the year and month indicator changes, and the resulting hash operation results in a new unique identification for the electronic device 102.

In an embodiment, the resulting unique identification can be in the form of an IP address. In this embodiment, the identifying information and the temporary identifier can be in the form of an IP address or any other identifier for the electronic device 102. While the resulting unique identifier may assume the form of an IP address, the resulting IP address may not be actually associated with the electronic device 102, the advertisement gateway 112, or any other device associated with the system 100. Rather, the IP address may comprise a representative IP address for the electronic device 102. In an embodiment, the advertisement gateway 112 may ensure that the IP address generated by the hashing operation falls within an acceptable range of IP addresses representative of the location of the electronic device 102, the advertisement gateway 112, the type of the electronic device 102, and the like. For example, the IP address may be representative of a device operating within the United States in terms of the IP address value falling within a range of values associated with the United States. When an electronic device is associated with a different region, the IP address may be representative of the corresponding region. This may allow the IP address to be validated in when received by the content servers. The resulting IP address may not be associated with any actual end point address, but rather acts as a unique identification for the electronic device 102 that can be used to identify the electronic device 102 to the content servers on a temporary basis.

In step 258, the identifying information in the request message is replaced with the unique identification. By substituting the unique identification for the identifying information in the request message, the unique identification can appear to be the identifying information for the electronic device 102 when the request message is received by the content server. In an embodiment, the unique identification can replace the identifying information in the header of the request message. In some embodiments, the advertisement gateway 112 may record the correlation between the identifying information and the unique identification in a lookup table, for example in the memory store 113 associated with the advertisement gateway 112.

In step 260, the request message comprising the unique identification is sent to the content server. The content server can comprise one or more of the servers 114, 116, 118, 120. For example, the request message can be sent from the advertisement gateway 112 to one or more of the advertisement provider servers 118, 120 and/or one or more of the content provider servers 114, 116. The selection of the specific server may be based on the content requested in the request message, a format of the content requested by in the request message, and/or selection logic within the advertisement gateway 112.

The selected content server may receive the request message and determine the unique identification. The unique identification may appear to be the identifying information of the electronic device 102 to the content server. Subsequent messages in the period in which the temporary identifier remains constant can comprise the same unique identification, indicating to the content server that the messages are being sent from the same electronic device 102. When the temporary identifier changes, subsequent request messages from the electronic device 102 can appear to be a new electronic device 102, and the changing unique identification can limit or prevent profiling of the electronic device 102.

In response to receiving the request message comprising the unique identification, the content server may send the content back to the advertisement gateway 112. At step 262, the content can be received at the advertisement gateway 112. The content can include an advertisement from one or more of the advertisement provider servers 118, 120, and/or content associated with an advertisement from one or more of the content provider servers 114, 116 and/or the advertisement provider servers 118, 120.

In step 264, the content can be sent from the advertisement gateway 112 to the electronic device 102. The advertisement gateway 112 can route the content to the electronic device 102 in a number of ways. In an embodiment, the content can be routed to the electronic device 102 based on the unique identification. For example, the advertisement gateway 112 may utilize a lookup table that correlates the unique identification with the identifying information for each electronic device 102. The lookup table may be used when a one-way secure cryptographic hash function is used. The unique identification can be returned with the content from the content server and used to identify the electronic device 102. In some embodiments, the advertisement gateway 112 may be capable of reversing the hashing operation to extract the identifying information, which would not be considered a one-way hashing function. Alternatively, the identifying information can be embedded in the request message and returned with the requested content. The advertisement gateway 112 can then extract the identifying information to route the content to the electronic device 102.

In response to receiving the content from the advertisement gateway 112, the electronic device 102 may render the content on a display or execute the content to provide an output on the electronic device 102, as described in more detail with respect to the method 200. The user of the electronic device 102 may then interact with the advertisement and/or content. For example, a user may select at least a portion of the advertisement. The interaction with the advertisement may generate further content requests, each of which may be routed through the advertisement gateway 112 in the same or similar way described in method 250.

The use of the hash operation to combine the identifying information from the electronic device 102 with a temporary identifier provides a temporary unique identification for the electronic device 102. The temporary unique identification may be created during a first time period, during which the temporary identifier may remain constant. During this time period, any subsequent message received by the advertisement gateway 112 from the electronic device 102 may be processed using the same unique identification. For example, a second request message received at the advertisement gateway 112 during a first time period can have the identifying information in the second request message hashed with the same temporary identifier, which in an embodiment, may be a temporal identifier. The same unique identifier created in response to the first request message received in step 252 can be created for the electronic device 102 based on the hashing. The identifying information in the second request message can then be replaced with the unique identifier, which can be the same as the unique identification created for the first request message. The second request message comprising the unique identification can be sent to a content server. The advertisement gateway 112 can then receive the content based on the second request message, and the content can then be routed to the electronic device 102. This process can be repeated during the first time period and the same unique identification can be generated for use with the request messages.

When the temporary identifier expires, changes, or is otherwise replaced, a second temporary identifier can be used to generate the unique identification during a second time period. Based on the change to the temporary identifier, the hash operation can generate a different unique identification for the electronic device 102 during the second time period. For example, a second request message received at the advertisement gateway 112 during the second time period, which can be after the first time period, can have the identifying information in the second request message hashed with a second temporary identifier, which in an embodiment, may be a second temporal identifier. A second unique identifier created in response to the second request message received in step 252 can be created for the electronic device 102 based on the hashing of the identifying information and the second temporary identifier. The identifying information in the second request message can then be replaced with the second unique identifier, which can be different than the unique identification created for the first request message during the first time period. The second request message comprising the second unique identification can be sent to a content server. The advertisement gateway 112 can then receive the content based on the second request message, and the content can then be routed to the electronic device 102.

The system 100 may also be used to ensure that communications between the electronic device 102 and the content servers passes through the advertisement gateway 112. In an embodiment, the advertisements and/or content associated with the advertisements that is routed through the advertisement gateway 112 may contain references to external content sources. For example, an advertisement may contain links to external multimedia files that may be accessed in order to render the advertisement on the electronic device 102. In some embodiments, the links may be activated when an advertisement is selected on the electronic device 102. The links may directly reference external content sources, and a request for the content may attempt to route directly to an external content source to retrieve the content. The direct routing to the external content sources may bypass the ability of the advertisement gateway 112 to alter the identifying information in the request as well as allow content that is not filtered by the advertisement gateway 112 to pass to the electronic device 102. In order to shield the identity of the electronic device 102 and screen the content passing to the electronic device 102, the advertisement gateway 112 may analyze the content passing through the advertisement gateway 112 and alter any external content references to be directed to the advertisement gateway 112. Upon receiving the content requests generated by the altered references, the advertisement gateway 112 may extract the external content source references and use the references to obtain the content before passing the content back to the electronic device 102. In this manner, the advertisement gateway 112 may serve to provide an additional layer of security for the electronic device 102.

Figure 4:
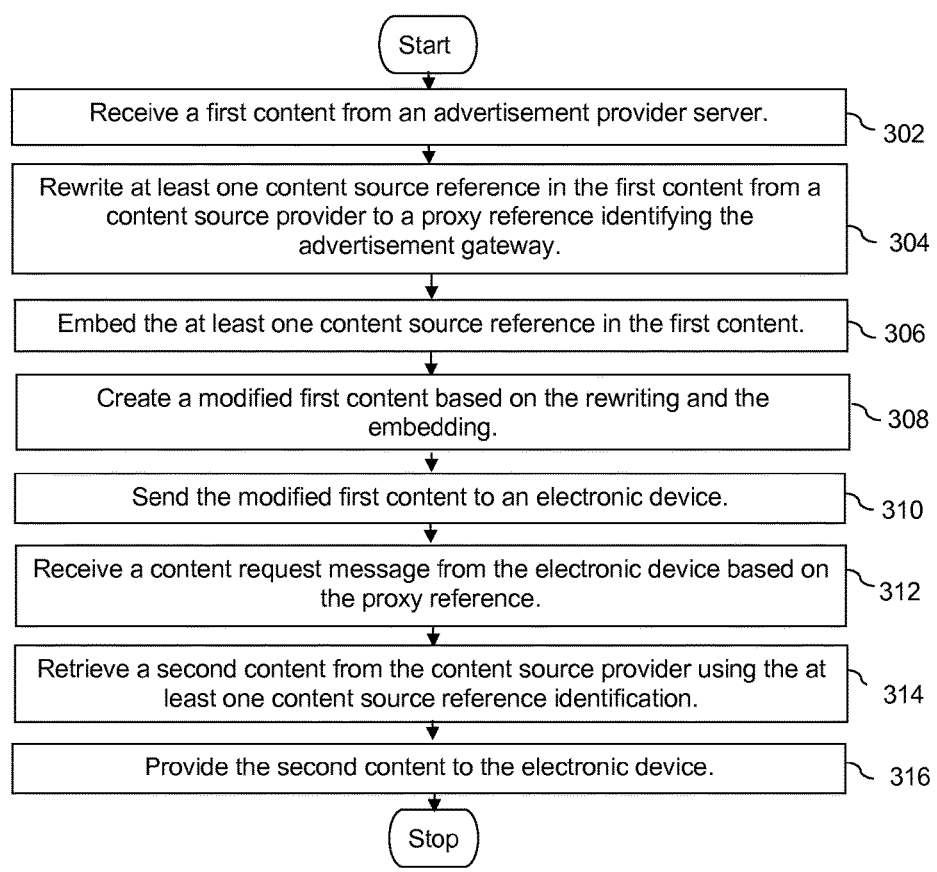
FIG. 4 is a flowchart illustrating a method for proxying content between content servers and an electronic device according to some embodiments of the present disclosure.

FIG. 4 is a flowchart illustrating a method 300 for proxying content between content servers 114, 116, 118, 120 and an electronic device 102 to direct any content provided to the electronic device 102 through the advertisement server 112. Referring to FIGS. 1 and 4, the method 300 may be used to ensure that content requests generated on the electronic device 102 are routed through the advertisement gateway 112 rather than allow content and/or advertisement requests to bypass the advertisement gateway 112.

In step 302, content is received from a content server at the advertisement gateway 112. The content can include an advertisement and/or content associated with an advertisement provided by a corresponding advertisement provider server 118, 120 and/or a content provider server 114, 116. In an embodiment, the content can comprise an advertisement received from an advertisement server 118, 120. The content can include at least one reference to a content source other than the advertisement gateway 112. The reference may be used for a variety of purposes including requesting additional content or data for rendering an advertisement, reporting a selection of the advertisement or content, requesting new content to display upon a selection of the advertisement, or the like. While the request resulting from the reference can be used to report and/or retrieve various content and data, the requested information will be referred to as secondary content herein to refer to all of the possible options in the interest of clarity. The content containing the content source reference may be returned based on a content request message sent from the electronic device 102 to the content server through the advertisement gateway 112 as described in more detail above. Any of the methods 200, 250 described above can be used in conjunction with the method 300 to provide the content request message to the content server while shielding the identifying information of the electronic device 102 from the content server or servers.

Upon receiving the content from the content server, the advertisement gateway 112 may analyze the content and determine if any content source references are present that reference a server or source external to the advertisement gateway 112. If any content source references to an external source are detected, then in step 304, at least one of the external content source references can be rewritten from the external content source reference to a proxy reference identifying the advertisement gateway 112. The rewriting of the external content source reference to the proxy reference allows any request for secondary content generated by the reference to be routed through the advertisement gateway 112 rather than being directly sent to the electronic device 102 from the content server.

In step 306, the external content source reference that is rewritten can be embedded in the content. When the external content source reference is rewritten to the proxy reference, a content request message requesting the secondary content can be routed to the advertisement gateway 112 using the proxy reference. In order to route the request for the secondary content from the advertisement gateway 112 to the appropriate content server, the external content source reference can be embedded in the content and passed as a parameter in the content sent to the electronic device 102. The embedded external content source reference can then be passed as a parameter in a subsequent request for any secondary content sent to the advertisement gateway 112 using the proxy reference.

In step 308, a modified content is created based on rewriting the external content source reference and embedding the external content source reference in the content. The modified content comprises the proxy reference identifying the advertisement gateway 112 as well as the external content source reference embedded as a parameter in the content. In step 310, the modified content can be sent from the advertisement gateway 112 to the electronic device 102.

When the modified content is received at the electronic device 102, the content may be rendered as an advertisement, a portion of an advertisement, content generated based on the selection of an advertisement, and/or as content requested by the electronic device 102. A secondary content request message can be generated based on a number of actions on the electronic device 102. For example, the rendering process may execute a portion of the content, which can contain a link requesting the secondary content. During the execution of the content, a request for the secondary content can be generated based on the link. In some embodiments, a user of the electronic device 102 may select a portion of the modified content that is rendered, whether it is an advertisement, a web page, or some other media or multimedia display. The selection may initiate the request for the secondary content. For example, an advertisement can be displayed on the electronic device 102. A selection of the advertisement may generate a request for secondary content comprising additional information or a web page containing additional information on the product being advertised in the advertisement.

Regardless of how the request for the secondary content is generated, the request for the secondary content can identify the proxy reference and contain the embedded external content source reference. In step 312, the secondary content request can be received by the advertisement gateway 112 from the electronic device 102 based on the proxy reference. The secondary content request received at the advertisement gateway 112 can identify one or more external content source references, for example, as a parameter in the request message.

In step 314, the advertisement gateway 112 can retrieve the secondary content from the content provider identified by the external content source reference. Upon receiving the secondary content request message, the advertisement gateway 112 can extract the external content source reference from the request and generate a secondary content request message containing the external content source reference as the destination address. In an embodiment, the advertisement gateway 112 can generate the secondary content request message by rewriting the secondary content request message to include the external content source reference. The content request message can then be sent to the content server identified by the external content source reference included in the original content provided to the advertisement gateway 112. In an embodiment, the content server can be a content provider server 114, 116, an advertisement provider server 118, 120, or any other source of content. Upon receiving the secondary content request message from the advertisement gateway 112, the content server can return the requested content to the advertisement gateway 112, which can be identified as the source of the secondary content request message.

In step 316, the advertisement gateway 112 can provide the secondary content from the external content source provider to the electronic device 102. The secondary content can then be rendered, displayed, executed, or otherwise processed by the electronic device 102. In providing the secondary content to the electronic device 102, the method 300 may be repeated to ensure that any external content source references in the secondary content are rewritten to include the proxy reference to the advertisement gateway 112. Using this method 300, the content requests and responses can be routed through the advertisement gateway 112.

Figure 5:
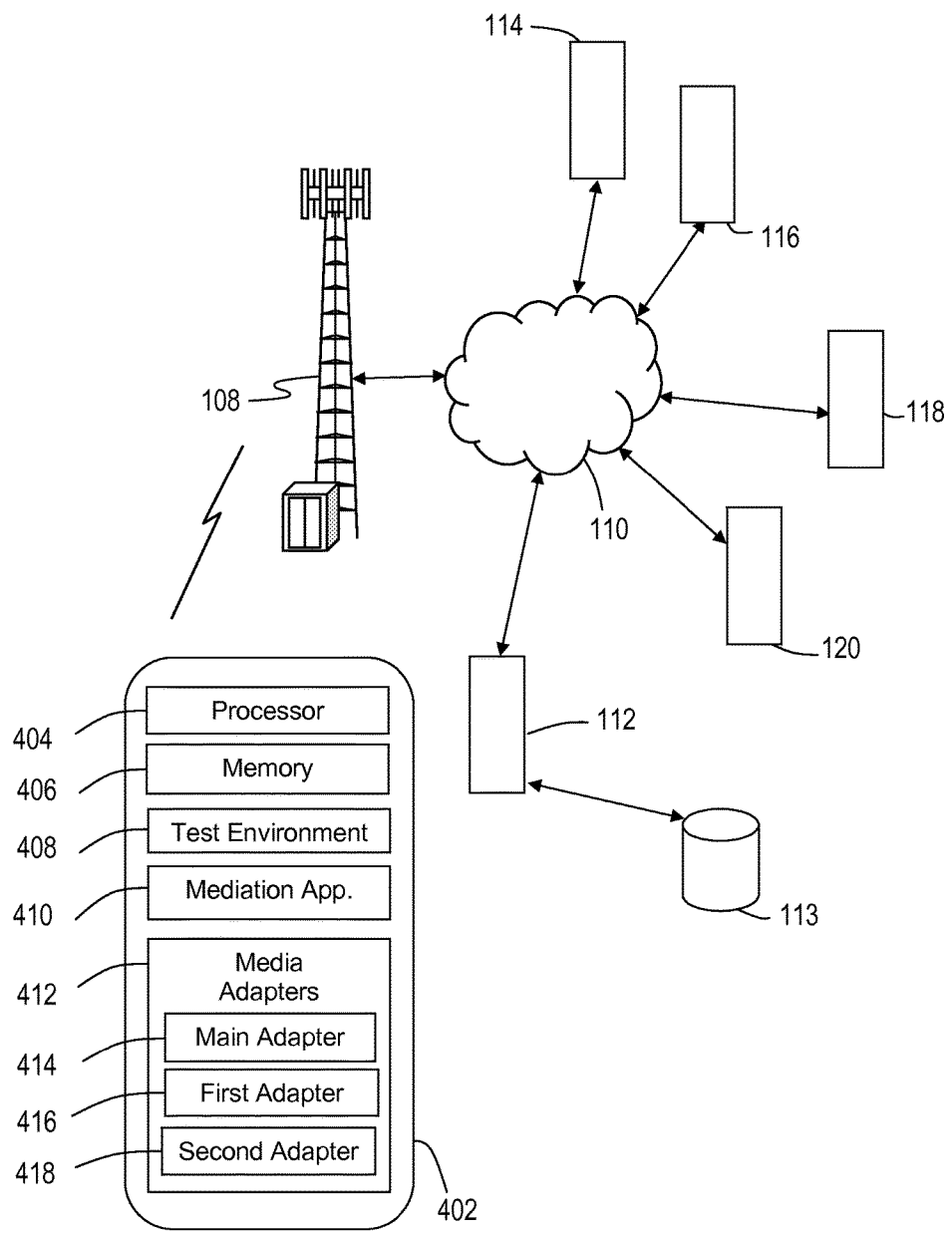
FIG. 5 is a schematic illustration of a wireless communications system according to some embodiments of the present disclosure.

FIG. 5 shows a communications system 400 that is similar to the communication system 100 described above with respect to FIG. 1. In the interest of clarity, similar components will not be described in detail. For example, the base transceiver station 108, the network 110, the content provider servers 114, 116, the advertisement provider servers 118, 120, the advertisement gateway 112, and the memory store 113 may all be the same or similar to the components described above with respect to FIG. 1. Further, each of these components can perform the functions described with respect to any of FIGS. 1 to 4.

FIG. 5 depicts the electronic device 402 as comprising a processor 404, a memory 406, a test environment execution application 408, and a plurality of media adapters 414, 416, 418. The electronic device 402 may take any of the forms described above with respect to the electronic device 402.

The electronic device 402 may comprise a processor 404 and a memory 406. One or more applications that serve to direct content requests through the advertisement gateway 112 that could otherwise be directed to an external content provider server can be stored in the memory 406 and execute on the processor 404. The application may operate to direct request messages that do not have the external content source references rewritten by the advertisement gateway 112. The electronic device 402 may also comprise one or more applications that serve to direct and/or request content and/or an advertisement from a specific content and/or advertisement provider server. The ability of the electronic device 402 to direct the selection of an advertisement may aid in alleviating the load on the advertisement gateway 112.

In an embodiment, advertisements and/or content can be provided to the electronic device 402. As noted above, additional content such as the secondary content discussed herein, may be requested as a result of rendering initial content on the electronic device 402 and/or based on an action of the user of the electronic device 402 (e.g., selecting an advertisement, a link, etc.). When the content passes through the advertisement gateway 112, the advertisement gateway 112 may attempt to rewrite the external content source reference to a proxy reference identifying the advertisement gateway 112. However, in some instances, the external content source references in the content may not be rewritten at the advertisement gateway 112. For example, the content may be in a format that is not recognized by the advertisement gateway 112. As a result, the advertisement gateway 112 may not be able to rewrite the external content source reference when the content is sent to the electronic device 402. In some embodiments, the external content source reference may be inaccessible until an action occurs on the electronic device 402 (e.g., selecting a portion of the content, rendering the content, etc.). In this case, the external content source reference may be hidden or inaccessible until the secondary content request message is generated. Numerous other scenarios can result in the external content source reference not being rewritten in the advertisement gateway 112 prior to the content being sent to the electronic device 402.

The electronic device 402 may comprise a test environment execution application 408 configured to allow a content to be executed to determine if any outbound request messages are directed to a destination other than the advertisement gateway. The test environment execution application 408 may configure the processor 404 to first render and/or execute the content received by the electronic device 402. In an embodiment, all of the content received by the electronic device 402 may first be rendered in the test environment to determine if any outgoing secondary content requests are generated.

The test environment execution application 408 may also configure the processor 404 to detect any outbound requests generated by the rendering and/or execution of the content. The test environment execution application 408 can then extract a destination address from the outbound requests. The destination address can be compared to the address for the advertisement gateway 112. When the destination address does not match the address for the advertisement gateway 112, the test environment execution application 408 can configure the processor 404 to rewrite the destination address to the advertisement gateway address. The destination address can be rewritten in the content being executed in the test environment execution application 408. Upon being subsequently executed outside the test environment execution application 408, the content may then generate a secondary content request message directed to the advertisement gateway 112. The destination address can be included as a parameter in the content, and the test environment execution application 408 can configure the processor 404 to rewrite the content to include the destination address as a parameter in any secondary content request generated by the rendering and/or execution of the content. Rewriting the destination address and including the destination address as a parameter in the content can create a modified content. The test environment execution application 408 can then configure the processor 404 to release the modified content to be rendered and/or executed in the normal execution environment on the electronic device 402.

When an outbound request contains a destination address that is not the advertisement gateway 112, the test environment execution application 408 may generate a definition file identifying the type of advertisement, the destination address, and/or a definition of the content or code that generated the outbound request. This information can then be sent back to the advertisement gateway 112 where it can be used to update the definitions of the content that should be rewritten. In this way, the advertisement gateway 112 may handle future instances of re-writing the content so that the requests are routed through the advertisement gateway 112, and the test environment execution application 408 may be used to detect and update any definitions of the types of content that should be rewritten in the advertisement gateway 112.

In some embodiments, less than all of the content received at the electronic device 402 may be rendered or executed in the test environment execution application 408. For example, only the content received from the advertisement gateway 112 may be rendered or executed in the test environment execution application 408. In some embodiments, only a portion of the content may be rendered or executed in the test environment execution application 408. For example, a random sampling and/or a predetermined selection (e.g., every other advertisement, one advertisement per hour, etc.). In some embodiments, one or more triggers or thresholds may be used to determine when content received at the electronic device 402 is executed in the test environment execution application 408. For example, the test environment execution application 408 may execute the content in the test environment execution application 408 when the content is received or originates from an unknown advertisement source, when the content contains unrecognized content, when the content has not previously been received by the electronic device 402, and/or when the advertisement gateway 112 marks or otherwise flags the content as being a candidate for execution or rendering in the test environment execution application 408. In some embodiments, the advertisement gateway 112 may mark or flag content that has unrecognized content, an unrecognized format, is from an unrecognized or untrusted provider, has been reported as containing outside references by other electronic devices, and/or otherwise contains indicators that the content should be executed in the test environment execution application 408.

In an embodiment, the electronic device 402 may also comprise one or more applications that serve to direct and/or request content from a specific content provider server. In general, the advertisement mediation system utilizes the advertisement gateway 112 to contain the advertisement selection logic as well as acting as a gateway for the communications between the advertisement/content providers and the electronic device 402. In some embodiments, a portion of the functionality of the advertisement gateway 112 can be carried out by the electronic device 402 based on an input from the advertisement gateway 112. The input may trigger the use of a media adapter application 412, which can comprise a plurality of individual adapters 414, 416, 418. The main adapter 414 may be responsible for generating the content and/or advertisement requests sent to the advertisement gateway 112. For example, when an application determines that an advertisement or content related to an advertisement is needed, the application may invoke the main adapter 414 to determine the appropriate routing and logic for requesting the advertisement and/or content. The main adapter 414 may then generate the content request message and send the message to the advertisement gateway 112. The content request message may contain various parameters such as a format for the advertisement, an identification of specific content requested, a destination address of the server storing the requested content, and the like. When the content comprises an advertisement, the main adapter 414 may simply request an advertisement as well as provide basic parameters such as the format of the advertisement, the number of advertisements requested, and potentially context about the application in which the advertisement will be displayed. In response to the request message, applications within the advertisement gateway 112 may utilize logic to select the appropriate provider server, obtain the requested content, and return the requested content to the electronic device 402.

In an embodiment, the advertisement gateway 112 can allow the electronic device 402 to determine which advertisement is sent to the electronic device 402. The advertisement gateway 112 may maintain a level of control by providing feedback to the electronic device 402 on which adapter should be used to generate the request message. In general, a plurality of adapters 416, 418 may be present in addition to the main adapter 414. The additional adapters 416, 418 can contain selection logic and/or instructions to contact specific advertisement provider servers 118, 120. For example, the first adapter 416 may be configured to generate a request message identifying the first advertisement provider server 118, and the second adapter 418 may be configured to generate a request message identifying the second advertisement provider server 120. In some embodiments, each adapter 416, 418 may be configured to contact a plurality of advertisement provider servers according to selection logic that can include a specific order for attempting to contact the servers, a specific selection based on input from the advertisement gateway 112, or the like. While described as comprising logic for contacting an advertisement provider server, the adapters 414, 416, 418 can also comprise logic for contacting one or more content provider servers 114, 116. In an embodiment, the advertisement gateway 112 may allow the electronic device 402 to select an advertisement from an advertisement provider server by returning a message in response to a request for an advertisement indicating which adapter should be used to generate a second request for the advertisement. In some embodiments, the message returned from the advertisement gateway 112 may designate a plurality of adapters that should be used and the order in which they should be used. The resulting designation of the adapter or adapters may then serve to allow the electronic device 402 to generate the request for the advertisement or content. The request may pass through the advertisement gateway 112, or in some embodiments, directly to the advertisement or content provider server.

In order to carry out the advertisement mediation by the electronic device 402, the electronic device 402 may comprise a mediation application 410 configured to allow the electronic device 402 to generate a request for an advertisement or content in response to an authorization message from the advertisement gateway 112. The mediation application 410 can configure the processor 404 to generate a request for an advertisement. For example, the mediation application 410 can invoke the main adapter 414 to generate a request for an advertisement. The mediation application 410 can then send the request to the advertisement gateway 112, for example, by instructing the main adapter 414 to send the request to the advertisement gateway 112. The advertisement gateway 112 may receive the request for the advertisement and return a response to the electronic device 402 without providing an advertisement. The response may comprise an indication of one or more adapters that should be invoked to generate a request to an appropriate advertisement provider server 118, 120. The mediation application 410 can then invoke a media adapter based on the adapter identified in the response from the advertisement gateway 112. The media adapter can then be invoked by the mediation application 410. The media adapter may have selection logic configured to contact a specific advertisement provider server and/or a plurality of advertisement provider servers in a specific order. The media adapter can generate an advertisement request message, which can be sent to the advertisement provider server selected by the media adapter. In response to the advertisement request message, the mediation application 410 can allow the electronic device 402 to receive the advertisement as a result of invoking the media adapter. The advertisement request message can be sent through the advertisement gateway 112. In some embodiments, an advertisement provider server may be trusted by a communication service provider or the advertisement gateway 112 may allow communications to proceed directly to certain advertisement provider servers. In these and other cases, the advertisement request message can be sent directly from the electronic device 402 to the advertisement provider server.

Figure 6:
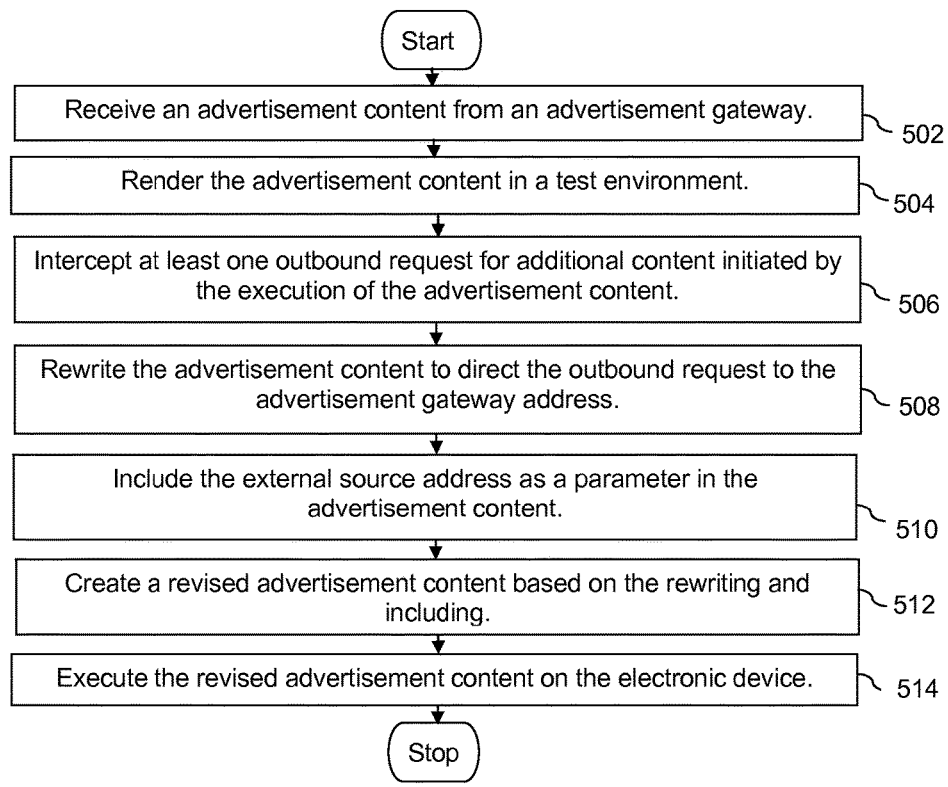
FIG. 6 is a flowchart illustrating a method for routing content request messages through an advertisement gateway according to some embodiments of the present disclosure.

The communication system 400 may be used to carry out various methods. FIG. 6 is a flowchart illustrating a method 500 for routing content request messages through an advertisement gateway 112. Referring to FIGS. 5 and 6, the method 500 may be used to ensure that content requests generated on the electronic device 402 are routed through the advertisement gateway 112 rather than allow content and/or advertisement requests to bypass the advertisement gateway 112. Any of the methods described herein can be used in conjunction with the method 500 to route content through the advertisement gateway 112.

In step 502, content is received from an advertisement gateway. The content can be an advertisement from an advertisement provider server that has been delivered through the advertisement gateway 112. In some embodiments, the content can be content associated with an advertisement.

Upon receiving the content from the advertisement gateway 112, the electronic device 402 may initiate a test environment. For example, a test environment execution application 408 may execute on the processor to initiate a test environment. The test environment may provide a location in which the content can be rendered without access to the associated outputs on the electronic device 402 and where the attempted access of the outputs can be detected. In step 504, the content can be rendered or executed in the test environment. Within the test environment, the content can be rendered and any outbound messages can be determined without providing any access to the components of the electronic device 402. For example, the content can be rendered or executed without allowing any outbound messages to access the communication components of the electronic device 402 and without allowing the content to be displayed or output on any output devices (e.g., a display, a speaker, a ringer, etc.) associated with the electronic device 402. Further, any outbound messages or communications are prevented from being communicated outside the test environment. In this context, the test environment can be considered to be a sandbox, a cage, or other isolated application environment.

In step 506 at least one outbound request for secondary content initiated by the execution of the content in the test environment can be intercepted. The destination address of the outbound request can be detected. The outbound request can request a variety of information such as secondary content associated with an advertisement. When the outbound request is directed to an external source address for an external source other than the advertisement gateway 112, the content can be rewritten to direct the outbound request for any secondary content to the advertisement gateway 112 in step 508. Rewriting the content can include altering the content, altering the content code, deleting a portion of the content, and/or adding additional content configured to redirect the outbound request to the advertisement gateway 112.

In order to properly direct the secondary content request, the external source address can be included as a parameter in the content in step 510. The external source address may be included as a parameter in a predetermined location that can be passed to the advertisement gateway 112 in the secondary content request message. The advertisement gateway 112 can then extract the external source address for use in directing the secondary content request to the appropriate address as described above.

In step 512, a revised content is created based on rewriting the content to include the advertisement gateway address and including the external source address as a parameter in the content. The process can be repeated for one or more of the outbound requests identified based on the rendering or execution in the test environment as having an external source address that is not the advertisement gateway 112. In some embodiments, the process can be repeated for all of the outbound requests identified as having an external source address that is not the advertisement gateway 112.

Once the content has been modified, the revised content can be executed on the electronic device 402 outside of the test environment in step 514. When the revised content is executed outside the test environment, one or more secondary content requests can be generated. The resulting secondary content requests comprise the advertisement gateway address as the destination address based on the rewriting. Further, the secondary content requests can comprise the external source address as a parameter that can be accessed by the advertisement gateway 112 for generating and directing the secondary source request to the appropriate content server. The advertisement gateway 112 can then rewrite the secondary content request message to include the external source address as the destination for the address and the advertisement gateway address as the origination address. The content server may then return the secondary content to the advertisement gateway 112, which may forward the secondary content on to the electronic device 402. The electronic device 402 can then receive the secondary content from the advertisement gateway 112. The method 500 can thus be used to route content requests through the advertisement gateway 112 even when the content is not rewritten or modified to remove the external source references by the advertisement gateway 112 prior being received at the electronic device 402.

The test environment can optionally create a definition file or list for the references, destination addresses, and content description that can be send back to the advertisement gateway 112. At a subsequent time, the content may be received by the advertisement gateway 112 and rewritten based on the definition provided by the test environment. This may shift the processing load from the electronic device 402 to the advertisement gateway 112, where the definitions of the content that is to be re-written is provided by the test environment.

When a plurality of advertisements or content is received at the electronic device 402, only a portion of the content may be rendered or executed in the test environment. In some embodiments, less than all of the content received at the electronic device 402 may be rendered or executed in the test environment execution application 408. For example, only the content received from the advertisement gateway 112 may be rendered or executed in the test environment execution application 408, and in some embodiments, only a portion of the content may be rendered or executed in the test environment execution application 408. Any of those considerations or triggers described above may be used to determine which portion (or all) of the content received at the electronic device 402 is executed in the test environment.

Figure 7:
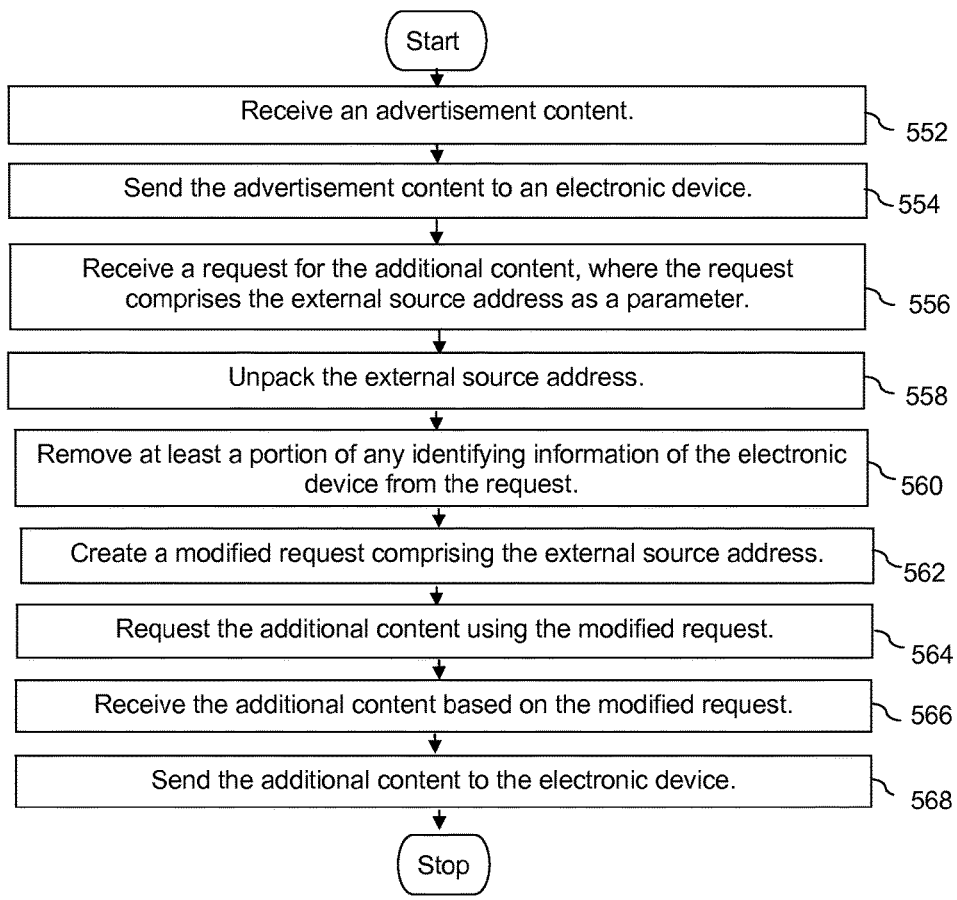
FIG. 7 is a flowchart illustrating a method for routing content request messages between an electronic device and a content server through an advertisement gateway according to some embodiments of the present disclosure.

FIG. 7 is a flowchart illustrating a method 550 for routing content request messages between an electronic device 402 and a content server through an advertisement gateway 112. Referring to FIGS. 5 and 7, the method 550 may be used to ensure that content requests generated on the electronic device 402 are routed through the advertisement gateway 112 rather than allow content and/or advertisement requests to bypass the advertisement gateway 112. Any of the methods described herein can be used in conjunction with the method 550 to route content through the advertisement gateway 112.

In step 552, content is received at an advertisement gateway 112. The content can be an advertisement from an advertisement provider server 118, 120 that has been delivered through the advertisement gateway 112. In some embodiments, the content can be content associated with an advertisement and may be provided by a content provider server 114, 116. The advertisement gateway 112 may send the content to the electronic device 402 in step 554. In an embodiment, the content comprises a content reference to an external source address other than the advertisement gateway 112. The external source address is configured to route a request for secondary content to a source or server other than the advertisement gateway 112.

In step 556, a secondary content request message for secondary content is received at the advertisement gateway 112. The secondary content can be content associated with the content sent to the electronic device 402. For example, the secondary content request message can be generated on the electronic device based on a link or other reference contained in the content. The secondary content request message can be received at the advertisement gateway 112 based on the advertisement gateway 112 address being included in the secondary content request message. The secondary content request message can also comprise an external source address. The external source address can be included as a parameter within the secondary content request message that is accessible by the advertisement gateway 112.

In step 558, the external source address can be accessed, for example, by being read, accessed, or unpacked from the secondary content request message. The external source address can identify the content source (e.g., a content provider server 114, 116 and/or an advertisement provider server 118, 120) storing the secondary content requested in the secondary content request message.

The secondary request message from the electronic device 402 may also comprise identifying information, including any of the identifying information described herein. In an embodiment, at least a portion of any identifying information for the electronic device 402 can be removed from the secondary request message by the advertisement gateway 112 in step 560. For example, any of the methods 200, 250 described herein can be used to remove or filter out at least a portion of any identifying information in the secondary request message.

The advertisement gateway 112 may then create a modified secondary content request message comprising the external source address in step 562. For example, the advertisement gateway 112 may rewrite the secondary content request message to include the external source address as the destination address for the request.

The modified secondary content request message can then be used to request the secondary content in step 564. For example, the modified secondary content request message can be sent to the content server using the external source address accessed in step 558. In an embodiment, the modified secondary content request message can be sent to one or more advertisement provider servers 118, 120 and/or one or more content provider servers 114, 116. In response to sending the modified secondary content request message, the secondary content can be received in step 566.

When the secondary content is received at the advertisement gateway 112, the secondary content can be sent to the electronic device 402 in step 568. Prior to sending the secondary content to the electronic device 402, the advertisement gateway 112 may carry out a method of modifying any external source references in the secondary content as described above. At the completion of the method 550, the secondary content may have been routed through the advertisement gateway 112 even when the original content contained links or references to a source external to the advertisement gateway 112.

Figure 8:
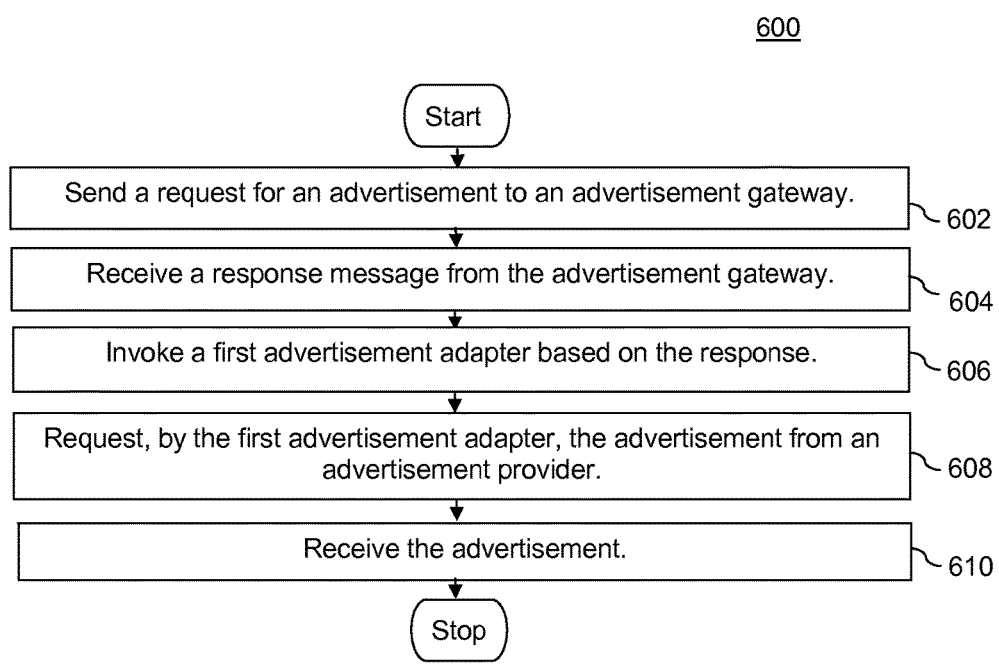
FIG. 8 is a flowchart illustrating a method for mediating advertisement selection by an electronic device according to some embodiments of the present disclosure.

FIG. 8 is a flowchart illustrating a method 600 for mediating advertisement selection by the electronic device 402. The method may allow the electronic device 402 to select an advertisement provider server 118, 120 for providing an advertisement to the electronic device 402. The advertisement gateway 112 may provide feedback to the electronic device 402 to guide the selection of the advertisement provider server 118, 120. The method 600 may aid in distributing the advertisement mediation function of the advertisement gateway 112 among the electronic devices served by the advertisement gateway 112, thereby reducing the load on the advertisement gateway 112 and providing a more efficient advertisement delivery to the electronic device 402.

In step 602, an electronic device 402 can send an advertisement request for an advertisement to the advertisement gateway 112. The request can include information on the type of advertisement requested, the format of the advertisement, the context in which the advertisement will be displayed, and/or any number of additional parameters about the electronic device (e.g., operating system, display resolution, etc.) and/or the advertisement.

Upon receiving the advertisement request, the advertisement gateway 112 may use selection logic to select among a plurality of advertisements provided by a plurality of advertisement provider servers. In some embodiments, the advertisement gateway 112 may determine that an advertisement is not available. For example, an advertisement may not be available based on the criteria or data provided in the advertisement request. In other embodiments, the advertisement gateway 112 may determine that the electronic device 402 should perform the advertisement selection. In either event, the advertisement gateway may return a response message to the electronic device indicating that no advertisement is available. The advertisement gateway 112 can utilize the selection logic to determine an advertisement server or servers that are most likely to supply an advertisement to the electronic device 402. The response message can then include an indication of the advertisement servers that should be contacted to obtain an advertisement.

While a direct indication of the advertisement servers, for example using specific advertisement server addresses, is possible, the advertisement gateway 112 can also provide a selection of media adapters on the electronic device that should be invoked. One or more media adapters 416, 418 on the electronic device 402 may then be invoked to carry out their selection logic for selecting an advertisement provider server to contact for an advertisement. Providing the selection of the media adapter or adapters may provide a more robust advertisement source selection logic than simply providing specific advertisement provider server addresses. For example, when specific addresses are provided, the listed advertisement provider servers may not have an advertisement that can be served to the electronic device 402. The electronic device 402 would then need to re-contact the advertisement gateway 112. By providing an indication of one or more media adapters to invoke on the electronic device 402, the selection logic within the media adapters 416, 418 can be utilized to locate an advertisement prior to the need to re-contact the advertisement gateway 112 for an advertisement.

In step 604, the response message is received by the electronic device 402 from the advertisement gateway 112. The response message comprises an indication that an advertisement is not available from the advertisement gateway 112. In an embodiment, the response message can comprise an indication that an advertisement is not available in a format identified by the advertisement request message. The response message also comprises an identification of one or more media adapters 414, 416 that should be invoked in order to obtain an advertisement. The identification of the one or more media adapters can include instructions for invoking the one or more media adapters from a plurality of media adapters 416, 418 on the electronic device 402. When more than one media adapter is identified, the response message may include a designation or logic for selecting each media adapter in a specific order. The identification of the one or more media adapters 416, 418 by the advertisement gateway 112 can be based on the advertisement request (e.g., the type of advertisement requested, the format of the advertisement, the context in which the advertisement will be displayed, the operating system of the electronic device, the electronic device display resolution, etc.), the selection logic within the advertisement gateway 112, a special advertisement campaign identified by the advertisement gateway 112, and the like.

Based on the response message received from the advertisement gateway 112, a first media adapter 416 identified in the response message can be invoked in step 606. The first media adapter 416 may be configured to request an advertisement, directly or through the advertisement gateway 112, from one or more specified advertisement provider servers 118, 120. The first media adapter 416 may also be configured to request the advertisement in a specific order when more than one advertisement provider server is available.

The first media adapter 416 can generate an advertisement request message specifying various information about the advertisement (e.g., format, resolution, etc.) and properly address and send the advertisement request to the selected advertisement provider in step 608. The first media adapter 416 can send the advertisement request message through the advertisement gateway 112 using any of the methods described herein. For example, a portion of any identifying information of the electronic device 402 and/or media adapter 416 can be removed or replaced by the advertisement gateway 112 as the advertisement request message passes through the advertisement gateway 112. When the advertisement request message is sent through the advertisement gateway 112, the request message can designate the advertisement provider, for example as a parameter in the message.

In some embodiments, the advertisement request message can be sent directly to the specified advertisement provider server 118, 120 from the electronic device 402. For example, the advertisement gateway 112 may delegate the ability to select the advertisement provider server to the media adapter on the electronic device 402 when the resulting advertisement provider server or servers are trusted by the advertisement gateway 112. The trust may be based on an agreement with the advertisement provider server not to profile the electronic device 402 or otherwise track the electronic device 402 when directly contacted by the electronic device 402.

In some embodiments, the advertisement request message sent to the advertisement provider server 118, either directly or through the advertisement gateway 112, may not result in an advertisement being returned. In this event, the media adapter 416 may be configured to contact a second advertisement provider server 120. The second advertisement request message can be generated as described herein and sent to the second advertisement provider server 120. In some embodiments, the process may be repeated for each advertisement provider server directed by the first media adapter 416. In this event, the electronic device 402 may send a second request to the advertisement gateway 112 when a single media adapter is identified or invoke a second media adapter 418 when a plurality of media adapters 416, 418 are identified in the response message from the advertisement gateway 112. If the advertisement gateway 112 is re-contacted, then the method may repeat from step 602. If one or more additional media adapters are identified in the response message from advertisement gateway 112, each subsequent media adapter may be invoked to request an advertisement from an advertisement provider server according to the selection logic in the corresponding media adapter.

In response to the advertisement request message, an advertisement provider server can serve an advertisement to the electronic device 402. In step 610, the advertisement can be received by the electronic device 402. The advertisement can be routed directly to the electronic device 402 from the advertisement provider server or the advertisement can be routed through the advertisement gateway 112. In an embodiment, the advertisement can be received in a format specified by the electronic device 402 in the advertisement request message. Upon being received by the electronic device 402, the advertisement can be rendered, resulting in an output on one or more output devices of the electronic device 402. For example, the advertisement can be rendered on a display of the electronic device 402.

Figure 9:
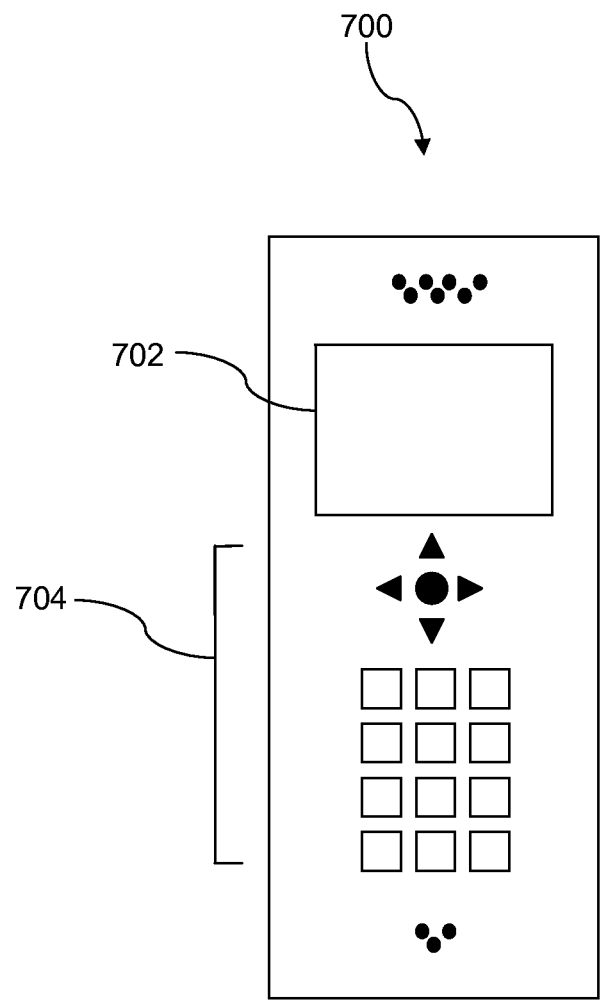
FIG. 9 is an illustration of a mobile communication device according to an embodiment of the disclosure.

FIG. 9 depicts the mobile device 700, which is operable for implementing aspects of the present disclosure, but the present disclosure should not be limited to these implementations. Though illustrated as a mobile phone, the mobile device 700 may take various forms including a wireless handset, a pager, a personal digital assistant (PDA), a gaming device, or a media player. The mobile device 700 includes a display 702 and a touch-sensitive surface and/or keys 704 for input by a user. The mobile device 700 may present options for the user to select, controls for the user to actuate, and/or cursors or other indicators for the user to direct. The mobile device 700 may further accept data entry from the user, including numbers to dial or various parameter values for configuring the operation of the handset. The mobile device 700 may further execute one or more software or firmware applications in response to user commands. These applications may configure the mobile device 700 to perform various customized functions in response to user interaction. Additionally, the mobile device 700 may be programmed and/or configured over-the-air, for example from a wireless base station, a wireless access point, or a peer mobile device 700. The mobile device 700 may execute a web browser application which enables the display 702 to show a web page. The web page may be obtained via wireless communications with a base transceiver station, a wireless network access node, a peer mobile device 700 or any other wireless communication network or system.

Figure 10:
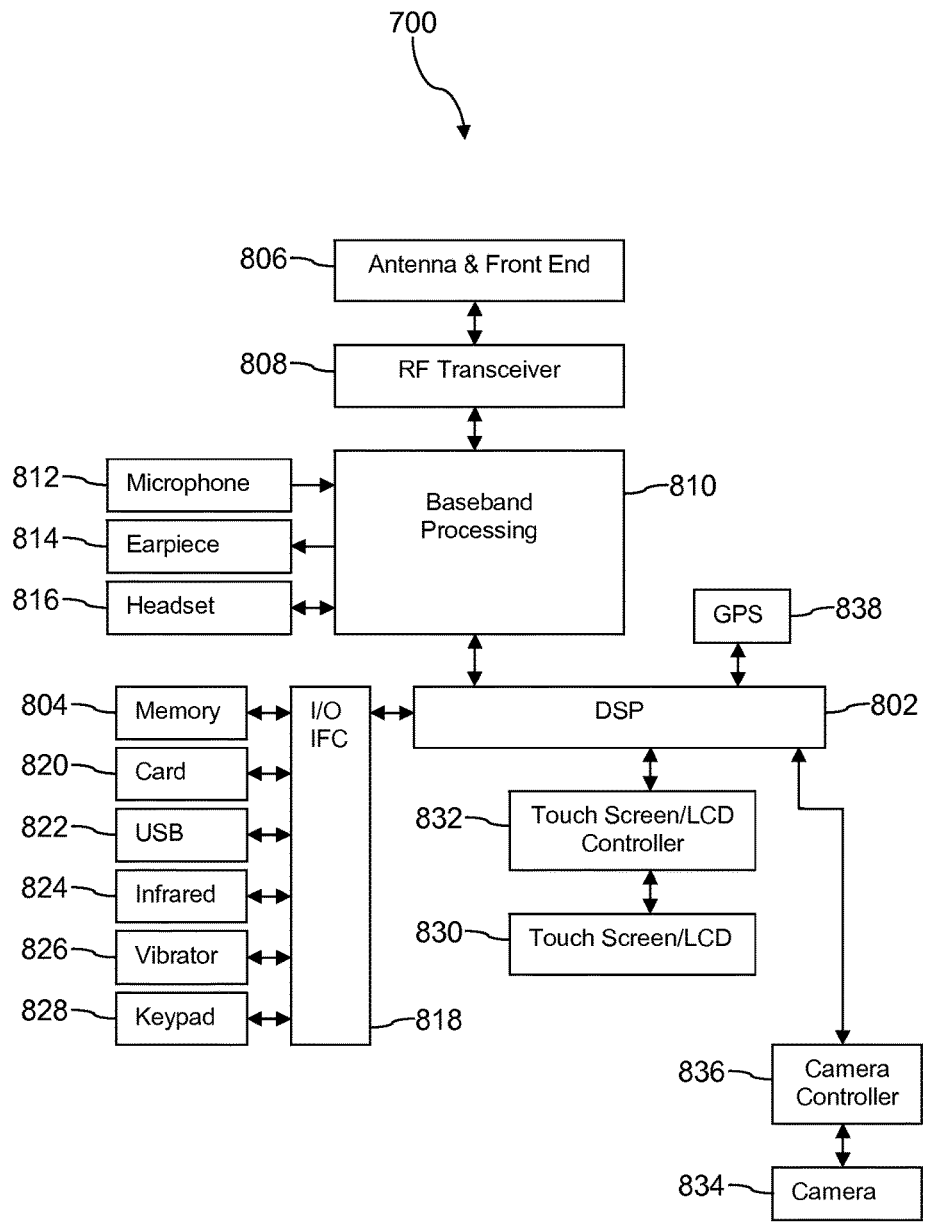
FIG. 10 is a block diagram of a mobile communication device according to an embodiment of the disclosure.

FIG. 10 shows a block diagram of the mobile device 700. While a variety of known components of handsets are depicted, in an embodiment a subset of the listed components and/or additional components not listed may be included in the mobile device 700. The mobile device 700 includes a digital signal processor (DSP) 802 and a memory 804. As shown, the mobile device 700 may further include an antenna and front end unit 806, a radio frequency (RF) transceiver 808, a baseband processing unit 810, a microphone 812, an earpiece speaker 814, a headset port 816, an input/output interface 818, a removable memory card 820, a universal serial bus (USB) port 822, an infrared port 824, a vibrator 826, a keypad 828, a touch screen liquid crystal display (LCD) with a touch sensitive surface 830, a touch screen/LCD controller 832, a camera 834, a camera controller 836, and a global positioning system (GPS) receiver 838. In an embodiment, the mobile device 700 may include another kind of display that does not provide a touch sensitive screen. In an embodiment, the DSP 802 may communicate directly with the memory 804 without passing through the input/output interface 818. Additionally, in an embodiment, the mobile device 700 may comprise other peripheral devices that provide other functionality.

The DSP 802 or some other form of controller or central processing unit operates to control the various components of the mobile device 700 in accordance with embedded software or firmware stored in memory 804 or stored in memory contained within the DSP 802 itself. In addition to the embedded software or firmware, the DSP 802 may execute other applications stored in the memory 804 or made available via information carrier media such as portable data storage media like the removable memory card 820 or via wired or wireless network communications. The application software may comprise a compiled set of machine-readable instructions that configure the DSP 802 to provide the desired functionality, or the application software may be high-level software instructions to be processed by an interpreter or compiler to indirectly configure the DSP 802.

The DSP 802 may communicate with a wireless network via the analog baseband processing unit 810. In some embodiments, the communication may provide Internet connectivity, enabling a user to gain access to content on the Internet and to send and receive e-mail or text messages. The input/output interface 818 interconnects the DSP 802 and various memories and interfaces. The memory 804 and the removable memory card 820 may provide software and data to configure the operation of the DSP 802. Among the interfaces may be the USB port 822 and the infrared port 824. The USB port 822 may enable the mobile device 700 to function as a peripheral device to exchange information with a personal computer or other computer system. The infrared port 824 and other optional ports such as a Bluetooth® interface or an IEEE 802.11 compliant wireless interface may enable the mobile device 700 to communicate wirelessly with other nearby handsets and/or wireless base stations.

The keypad 828 couples to the DSP 802 via the input/output interface 818 to provide one mechanism for the user to make selections, enter information, and otherwise provide input to the mobile device 700. Another input mechanism may be the touch screen LCD 830, which may also display text and/or graphics to the user. The touch screen LCD controller 832 couples the DSP 802 to the touch screen LCD 830. The GPS receiver 838 is coupled to the DSP 802 to decode global positioning system signals, thereby enabling the mobile device 700 to determine its position.

Figure 11A:
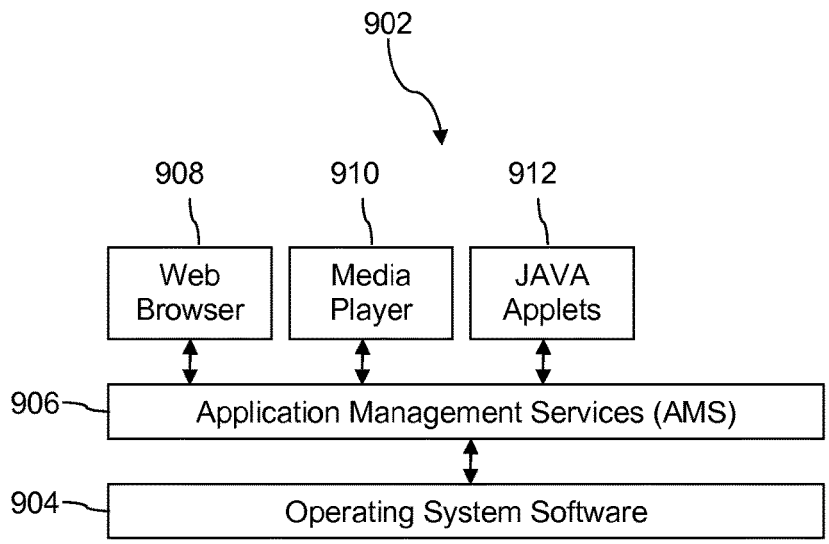
FIG. 11A is a block diagram of a software architecture of a mobile communication device according to an embodiment of the disclosure.

FIG. 11A illustrates a software environment 902 that may be implemented by the DSP 802. The DSP 802 executes operating system software 904 that provides a platform from which the rest of the software operates. The operating system software 904 may provide a variety of drivers for the handset hardware with standardized interfaces that are accessible to application software. The operating system software 904 may be coupled to and interact with application management services (AMS) 906 that transfer control between applications running on the mobile device 700. Also shown in FIG. 11A are a web browser application 908, a media player application 910, and JAVA applets 912. The web browser application 908 may be executed by the mobile device 700 to browse content and/or the Internet, for example when the mobile device 700 is coupled to a network via a wireless link. The web browser application 908 may permit a user to enter information into forms and select links to retrieve and view web pages. The media player application 910 may be executed by the mobile device 700 to play audio or audiovisual media. The JAVA applets 912 may be executed by the mobile device 700 to provide a variety of functionality including games, utilities, and other functionality.

Figure 11B:
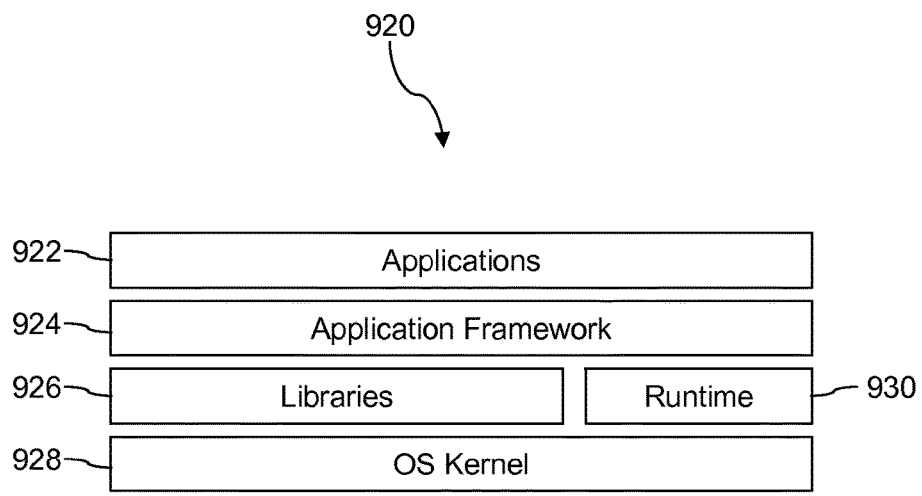
FIG. 11B is a block diagram of another software architecture according to an embodiment of the disclosure.

FIG. 11B illustrates an alternative software environment 920 that may be implemented by the DSP 802. The DSP 802 executes operating system kernel (OS kernel) 928 and an execution runtime 930. The DSP 802 executes applications 922 that may execute in the execution runtime 930 and may rely upon services provided by the application framework 924. Applications 922 and the application framework 924 may rely upon functionality provided via the libraries 926.

Figure 12:
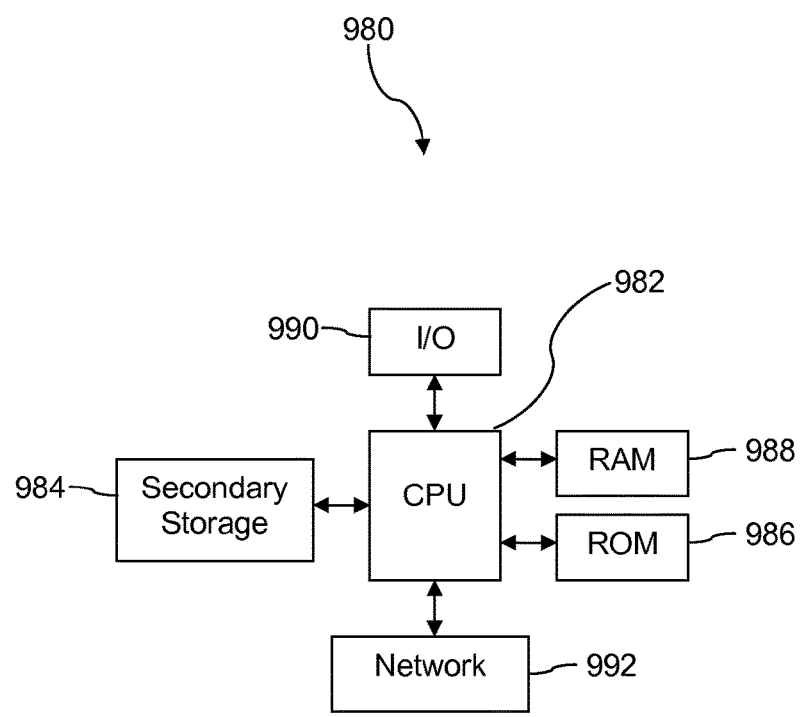
FIG. 12 illustrates an exemplary computer system suitable for implementing the several embodiments of the disclosure.

FIG. 12 illustrates a computer system 980 suitable for implementing one or more embodiments disclosed herein. The computer system 980 includes a processor 982 (which may be referred to as a central processor unit or CPU) that is in communication with memory devices including secondary storage 984, read only memory (ROM) 986, random access memory (RAM) 988, input/output (I/O) devices 990, and network connectivity devices 992. The processor 982 may be implemented as one or more CPU chips.

It is understood that by programming and/or loading executable instructions onto the computer system 980, at least one of the CPU 982, the RAM 988, and the ROM 986 are changed, transforming the computer system 980 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 984 is typically comprised of one or more disk drives or tape drives and is used for non-volatile storage of data and as an over-flow data storage device if RAM 988 is not large enough to hold all working data. Secondary storage 984 may be used to store programs which are loaded into RAM 988 when such programs are selected for execution. The ROM 986 is used to store instructions and perhaps data which are read during program execution. ROM 986 is a non-volatile memory device which typically has a small memory capacity relative to the larger memory capacity of secondary storage 984. The RAM 988 is used to store volatile data and perhaps to store instructions. Access to both ROM 986 and RAM 988 is typically faster than to secondary storage 984. The secondary storage 984, the RAM 988, and/or the ROM 986 may be referred to in some contexts as computer readable storage media and/or non-transitory computer readable media.

I/O devices 990 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 992 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 992 may enable the processor 982 to communicate with the Internet or one or more intranets. With such a network connection, it is contemplated that the processor 982 might receive information from the network, or might output information to the network in the course of performing the above-described method steps. Such information, which is often represented as a sequence of instructions to be executed using processor 982, may be received from and outputted to the network, for example, in the form of a computer data signal embodied in a carrier wave.

Such information, which may include data or instructions to be executed using processor 982 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 982 executes instructions, codes, computer programs, scripts which it accesses from hard disk, floppy disk, optical disk (these various disk based systems may all be considered secondary storage 984), ROM 986, RAM 988, or the network connectivity devices 992. While only one processor 982 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 984, for example, hard drives, floppy disks, optical disks, and/or other device, the ROM 986, and/or the RAM 988 may be referred to in some contexts as non-transitory instructions and/or non-transitory information.

In an embodiment, the computer system 980 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 980 to provide the functionality of a number of servers that is not directly bound to the number of computers in the computer system 980. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 980, at least portions of the contents of the computer program product to the secondary storage 984, to the ROM 986, to the RAM 988, and/or to other non-volatile memory and volatile memory of the computer system 980. The processor 982 may process the executable instructions and/or data structures in part by directly accessing the computer program product, for example by reading from a CD-ROM disk inserted into a disk drive peripheral of the computer system 980. Alternatively, the processor 982 may process the executable instructions and/or data structures by remotely accessing the computer program product, for example by downloading the executable instructions and/or data structures from a remote server through the network connectivity devices 992. The computer program product may comprise instructions that promote the loading and/or copying of data, data structures, files, and/or executable instructions to the secondary storage 984, to the ROM 986, to the RAM 988, and/or to other non-volatile memory and volatile memory of the computer system 980.

In some contexts, the secondary storage 984, the ROM 986, and the RAM 988 may be referred to as a non-transitory computer readable medium or a computer readable storage media. A dynamic RAM embodiment of the RAM 988, likewise, may be referred to as a non-transitory computer readable medium in that while the dynamic RAM receives electrical power and is operated in accordance with its design, for example during a period of time during which the computer specification 980 is turned on and operational, the dynamic RAM stores information that is written to it. Similarly, the processor 982 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of routing an advertisement based content request through an advertisement gateway, the method comprising:

receiving, on an electronic device from the advertisement gateway, an advertisement content in non-transitory memory of the electronic device;

rendering, by the electronic device executing a test environment execution application from the non-transitory memory, the advertisement content in a test environment;

intercepting, by the electronic device executing the test environment execution application, at least one outbound request for secondary content initiated by execution of the advertisement content, wherein the at least one outbound request is directed outside the electronic device and to an external source address other than the advertisement gateway;

rewriting, by the electronic device executing the test environment execution application, the advertisement content to direct the at least one outbound request to the advertisement gateway address instead of the external source address;

in response to the rewriting, creating, by the electronic device executing the test environment execution application, a revised advertisement content based on the rewriting;

writing, by the electronic device executing the test environment execution application, a definition file identifying a type of the advertisement content, the external source address, and a definition of a content of the at least one outbound request;

transmitting, by the electronic device executing the test environment execution application, the definition file to the advertisement gateway to update definitions of the advertisement gateway describing content for rewriting by the advertisement gateway when the content passes through the advertisement gateway, wherein the definition file is configured to cause the advertisement gateway to rewrite subsequent advertisement content to route outbound content requests from the electronic device through the advertisement gateway to their original destination to shift a processing load associated with rewriting the subsequent advertisement content from the electronic device to the advertisement gateway;

subsequent to creating the revised advertisement content, executing the revised advertisement content on the electronic device outside of the test environment;

upon executing the revised advertisement content outside of the test environment, generating, by the electronic device, a secondary content request message for second advertisement content based on the revised advertisement content, and redirecting the secondary content request message to the advertisement gateway via the advertisement gateway address based on the revised advertisement content; and receiving, by the electronic device from the advertisement gateway, the subsequent advertisement content rewritten based on the definition file by the advertisement gateway responsive to receipt of the definition file.

2. The method of claim 1, further comprising: including the external source address as a parameter in the revised advertisement content.

3. The method of claim 2, further comprising: releasing, by executing the test environment execution application on the electronic device, the revised advertisement content from being rendered in the test environment on the electronic device.

4. The method of claim 3, further comprising:
sending the secondary content request message to the advertisement gateway via the advertisement gateway address, wherein the request comprises the external source address as a parameter; and
receiving the second advertisement content from the advertisement gateway.

5. The method of claim 1, wherein rendering the advertisement content in the test environment comprises preventing the at least one outbound request from communicating outside the test environment.

6. The method of claim 1, wherein rewriting the advertisement content comprises at least one of: altering the advertisement content, altering content code, deleting a portion of the content, or adding secondary content configured to redirect the at least one outbound request to the advertisement gateway.

7. The method of claim 1, wherein receiving the advertisement content comprises receiving the advertisement content from the advertisement gateway with a flag indicating that the advertisement content is to be executed via the test environment.

8. A method of routing advertisement based content requests through an advertisement gateway on a network, the method comprising the following steps, all of which are performed by the advertisement gateway on the network:

receiving, at the advertisement gateway, a first advertisement content for execution on an electronic device;

in response to receiving the advertisement content, determining that the first advertisement content is received from a content server not recognized by the advertisement gateway;

based on the determination, inserting a flag into the first advertisement content indicating that the first advertisement content is to be executed by a test environment execution application on the electronic device;

subsequent to inserting the flag, sending the first advertisement content to the electronic device, wherein the first advertisement content comprises a secondary content reference to an external source address other than the advertisement gateway and directed outside the electronic device;

in response to sending the first advertisement content, receiving, at the advertisement gateway from the electronic device:
  a secondary content request for second advertisement content, wherein the secondary content request was rewritten by the electronic device to comprise the external source address as a parameter and redirect the secondary content request to the advertisement gateway instead of the external source address; and
  a definition file identifying a type of the first advertisement content, the external source address, and a definition of a content of the at least one outbound request;

accessing the external source address from the parameter in response to receiving the secondary content request;

removing at least a portion of any identifying information of the electronic device from the secondary content request;

in response to removing the at least the portion of any identifying information, creating a modified request comprising the external source address, wherein the modified request has the at least the portion of any identifying information of the electronic device removed;

requesting, from the external source address, the second advertisement content using the modified request via the external source address accessed from the parameter;

in response to requesting the secondary content, receiving, at the advertisement gateway, the second advertisement content based on the modified request;

subsequent to receiving the second advertisement content, sending the second advertisement content to the electronic device, updating, at the advertisement gateway, definitions of content to be rewritten by the advertisement gateway based on the definition file to shift a processing load associated with the rewriting of the content from the electronic device to the advertisement gateway;

receiving, at the advertisement gateway, a third advertisement content for execution on the electronic device; and rewriting, by the advertisement gateway, the third advertisement content based on the definition file to cause an outbound content request generated by the third advertisement content to be routed through the advertisement gateway.

9. The method of claim 8, wherein the secondary content request is generated by the electronic device in response to executing the advertisement content in a test environment.

10. The method of claim 8, wherein the secondary content request is generated by the electronic device rewriting the external source address to an advertisement gateway address.

11. The method of claim 8, wherein the external source address in the advertisement content is configured to route a request for secondary content to a server other than the advertisement gateway.

12. The method of claim 8, wherein the external source address identifies a server storing the second advertisement content requested in the secondary content request.

13. The method of claim 8, wherein creating the modified request comprises rewriting the secondary content request to include the external source address as a destination address.

14. The method of claim 8, further comprising: rendering the second advertisement content on the electronic device.

15. A system for directing advertisement content requests to an advertisement gateway, the system comprising:
an electronic device comprising:
a processor,
a non-transitory memory, and
a test environment execution application stored in the non-transitory memory, that when executed on the processor, configures the processor to:
render an advertisement content in a test environment created by execution of the test environment execution application,
in response to the advertisement content being rendered in the test environment, detect that the advertisement content generated an outbound request for secondary content directed to a destination address other than the advertisement gateway and external to the electronic device;
prevent the outbound request for secondary content from being sent from the test environment;
extract the destination address of the outbound request;
determine that the destination address of the outbound request does not match an advertisement gateway address;
in response to the destination address being different than the advertisement gateway address, rewrite the destination address in the advertisement content to the advertisement gateway address;
create a modified advertisement content based on the destination address being rewritten to the advertisement gateway address;
write a definition file identifying a type of the advertisement content, the destination address of the outbound request, and a definition of a content of the outbound request;
transmit the definition file to the advertisement gateway to update definitions of the advertisement gateway describing content for rewriting by the advertisement gateway when the content passes through the advertisement gateway, wherein the definition file is configured to cause the advertisement gateway to rewrite subsequent advertisement content to route outbound content requests from the electronic device through the advertisement gateway to their original destination to shift a processing load associated with rewriting the subsequent advertisement content from the electronic device to the advertisement gateway;
subsequent to the creation of the modified advertisement, execute the modified advertisement content on the electronic device outside of the test environment;
upon execution of the revised advertisement content outside of the test environment, generate a secondary content request message for second advertisement content based on the revised advertisement content and redirect the secondary content request message to the advertisement gateway via the advertisement gateway address; and
receiving, by the electronic device from the advertisement gateway, the subsequent advertisement content rewritten based on the definition file by the advertisement gateway responsive to receipt of the definition file.

16. The system of claim 15, wherein the test environment execution application further configures the processor to prevent the outbound request for the second advertisement content from being sent only while the advertisement content is rendered within the test environment.

17. The system of claim 15, wherein the test environment execution application further configures the processor to compare the destination address of the outbound request with the advertisement gateway address, and wherein the destination address is rewritten based on the comparison indicating that the destination address and the advertisement gateway address are different.

18. The system of claim 15, wherein the test environment execution application configures the processor to execute the modified advertisement content on the electronic device outside of the test environment.

19. The system of claim 15, wherein the test environment execution application further configures the processor to include the destination address as a parameter in the modified advertisement content when the destination address is different than an advertisement gateway address.

* * * * *